US011989558B2

(12) United States Patent
Mohan et al.

(10) Patent No.: US 11,989,558 B2
(45) Date of Patent: May 21, 2024

(54) AUTOMATIC GENERATION OF A CLOUD INTEGRATION ADAPTER FROM A STANDARD, PROGRAMMING LANGUAGE-AGNOSTIC INTERFACE SPECIFICATION

(71) Applicant: SAP SE, Walldorf (DE)

(72) Inventors: Mayur Belur Mohan, Bangalore (IN); Sunny Kapoor, Bangalore (IN); Shilpa Vij, Bangalore (IN); Finny Babu, Bengaluru (IN)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 17/679,517

(22) Filed: Feb. 24, 2022

(65) Prior Publication Data

US 2023/0266969 A1     Aug. 24, 2023

(51) Int. Cl.
*G06F 9/30*     (2018.01)
*G06F 9/50*     (2006.01)
*G06F 9/54*     (2006.01)

(52) U.S. Cl.
CPC ........ *G06F 9/30174* (2013.01); *G06F 9/5072* (2013.01); *G06F 9/541* (2013.01)

(58) Field of Classification Search
CPC ..... G06F 9/30174; G06F 9/5072; G06F 9/541
See application file for complete search history.

(56) References Cited

U.S. PATENT DOCUMENTS

| | | | | |
|---|---|---|---|---|
| 6,578,191 | B1* | 6/2003 | Boehme | G06F 9/541 |
| | | | | 717/137 |
| 7,093,264 | B2* | 8/2006 | Choi | G06F 8/71 |
| | | | | 719/316 |
| 7,546,309 | B1* | 6/2009 | Michel | G06F 9/548 |
| | | | | 707/999.102 |
| 9,436,487 | B2* | 9/2016 | Choudhury | G06F 9/44526 |
| 11,157,241 | B2* | 10/2021 | Kenkre | G06F 9/5072 |

(Continued)

OTHER PUBLICATIONS

Communication: "Extended European Search Report", dated Sep. 14, 2022 (Sep. 14, 2022), European Patent Office, for European Application No. 2216427.6-1203, 9pgs.

*Primary Examiner* — Douglas M Slachta
(74) *Attorney, Agent, or Firm* — Buckley, Maschoff & Talwalkar LLC

(57) ABSTRACT

According to some embodiments, methods and systems may provide integration adapter generation for a cloud computing environment. The system may include a smart adapter user interface component that receives a standard, programming language-agnostic interface specification. The smart adapter user interface component may then graphically interact with a user via a guided navigation, no-code wizard user interface to collect additional information associated with the standard, programming language-agnostic interface specification. A semantic model is then automatically generated by the smart adapter user interface component based on characteristics of the received standard, programming language-agnostic interface specification and the additional information. A smart adapter generator may receive the semantic model along with information about the standard, programming language-agnostic interface specification and automatically generate a Cloud Integration adapter.

16 Claims, 26 Drawing Sheets

(56) References Cited

U.S. PATENT DOCUMENTS

| | | | | |
|---|---|---|---|---|
| 11,665,241 B1* | 5/2023 | Wade | .................... | H04L 67/141 709/227 |
| 2009/0307651 A1* | 12/2009 | Senthil | ................... | G06Q 10/06 717/102 |
| 2014/0143763 A1* | 5/2014 | Bhargava | ................. | G06F 8/20 717/139 |
| 2014/0157228 A1* | 6/2014 | Pasternak | ................. | G06F 8/30 717/106 |
| 2017/0102925 A1* | 4/2017 | Ali | ............................ | G06F 8/30 |
| 2019/0205281 A1* | 7/2019 | Chiu | .................... | H04B 1/3877 |
| 2020/0081916 A1* | 3/2020 | McShane | ............... | G06N 20/00 |
| 2020/0387415 A1* | 12/2020 | Take | ....................... | G06Q 50/10 |
| 2021/0334149 A1* | 10/2021 | Take | ........................ | G06F 8/36 |
| 2021/0373860 A1* | 12/2021 | Khan | ..................... | G06F 9/546 |
| 2023/0236828 A1* | 7/2023 | K | .............................. | G06F 8/33 717/120 |

* cited by examiner

1300

```
{}
   S  basePath:"/api"
 ▶ {} definitions
c     S  description : "Learn more about the demo web API"
      S  url : "https://api.demo.com/web"
    S  host : "demo.com"
 ▼ {} info
      ▶ {} contact
           S  description : "One way to interact with the Demo
           S  title : "demo"
           S  version : "1.7.0"
 ▶ {} paths
 ▼ {} schemes
         S  : "https"
 ▼ {} securityDefinitions
      ▼ {} demoAuth
```

The bracket to the right of the info block is labeled 1301.

```
{
    "connector": "demo",
    "vendor": "SAP",
    "version": "1.0",
    "apiType": "REST",
    "apiVersion": "1.7.0",
    "apiEndpoint": "https://demo.com",
    "logo": "demo.png",
    "adapterCategory": "Collaboration",
    "apiBasePath": "/api",
    "apiDocumentation": "https://api.demo.com/web",
    "authenticationTokenProvider": "demoToken",
    "api":      {
        {
            "name": "chat",
            "alias": "Chat Channel APIs",
            "id": "chat",
            "description": "working with your demo channel...",
            "operations":     {
                {
                    "operationId": "chat_update",
                    "description": "this api updates the pre-existing...",
                    "alias": "Update message in demo channel"
                },
                {
                    "operationId": "chat_delete",
                    "description": "Deletes a message from demo...",
                    "alias": "Deletes a message from demo channel"
                },
                {
                    "operationId": "chat_postMessage",
                    "description": "Send a message into demo...",
                    "alias": "Post a message to demo channel"
                },
                {
                    "operationId": "chat_getPermalink",
                    "description": "Retrieve a permanent link URL...",
                    "alias": "Retrieve a permanent link URL for a ..."
                }
            }
        }
    }
)
```

1400 (overall)
1401 (chat_update block)

*FIG. 14*

| ADAPTER IDENTIFIER 2402 | OpenAPI DOCUMENT IDENTIFIER 2404 | SEMANTIC MODEL IDENTIFIER 2406 | ADAPTER CODE 2408 | CATALOG STATUS 2410 |
|---|---|---|---|---|
| A_101 | D_123 | SM_101.1 | IN PROCESS | IN PROCESS |
| A_102 | D_456 | SM_102.1 | | PRIVATE |
| A_103 | D_789 | SM_103.2 | | PUBLISHED |
| A_104 | D_123 | SM_104.1 | | DELETED |

AUTOMATIC GENERATION OF A CLOUD INTEGRATION ADAPTER FROM A STANDARD, PROGRAMMING LANGUAGE-AGNOSTIC INTERFACE SPECIFICATION

BACKGROUND

An enterprise may utilize a cloud computing environment to let users perform tasks. For example, the enterprise might let various users execute an application via the cloud computing environment to process purchase orders, adjust human resources information, generate invoices, etc. In a Graphical User Interface ("GUI") based multi-tenant integration service 150, such as SAP® Cloud Integration ("CPI") capability of the SAP® Integration Suite, an integration developer can combine integration components to create integration scenarios or flows including adapters (e.g., at the sender or receiver side of an integration flow). Manually creating these integration adapters, however, can be a complex, time consuming, and error-prone task—especially when a substantial number of adapters need to be created to support a wide variety of vendor interfaces.

The OpenAPI specification is one example of a standard, language-agnostic interface to Representational State Transfer ("REST") APIs that lets users and systems understand a service without access to source code, documentation, network traffic inspection, etc. A user can then understand and interact with the remote service with a minimal amount of implementation logic. An OpenAPI document (or set of documents) defines an API using the OpenAPI specification. The OpenAPI document can be used to display the API, generate servers and clients in various programming languages, test the API, etc.

It would therefore be desirable to provide for the automatic generation of a Cloud Integration adapter from a standard, programming language-agnostic interface specification.

SUMMARY

According to some embodiments, methods and systems may provide integration adapter generation for a cloud computing environment. The system may include a smart adapter user interface component that receives a standard, programming language-agnostic interface specification. The smart adapter user interface component may then graphically interact with a user via a guided navigation, no-code wizard user interface to collect additional information associated with the standard, programming language-agnostic interface specification. A semantic model is then automatically generated by the smart adapter user interface component based on characteristics of the received standard, programming language-agnostic interface specification and the additional information. A smart adapter generator may receive the semantic model along with information about the standard, programming language-agnostic interface specification and automatically generate a Cloud Integration adapter.

Some embodiments comprise means for receiving, by a computer processor of a smart adapter user interface component, a standard, programming language-agnostic interface specification; means for graphically interacting with a user via a guided navigation, no-code wizard user interface to collect additional information associated with the standard, programming language-agnostic interface specification; means for automatically generating a semantic model based on characteristics of the received standard, programming language-agnostic interface specification and the additional information; means for receiving, by a smart adapter generator, the semantic model from the smart adapter user interface component along with information about the standard, programming language-agnostic interface specification; and means for automatically generating, by the smart adapter generator, a Cloud Integration adapter.

Some technical advantages of some embodiments disclosed herein are improved systems and methods to provide an automatic generation of a Cloud Integration adapter from a standard, programming language-agnostic interface specification.

BRIEF DESCRIPTION OF THE DRAWINGS

FIG. 13 is a typical Swagger file in accordance with some embodiments.

FIG. 14 is a semantic model according to some embodiments.

FIG. 24 is a tabular portion of an adapter generation database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
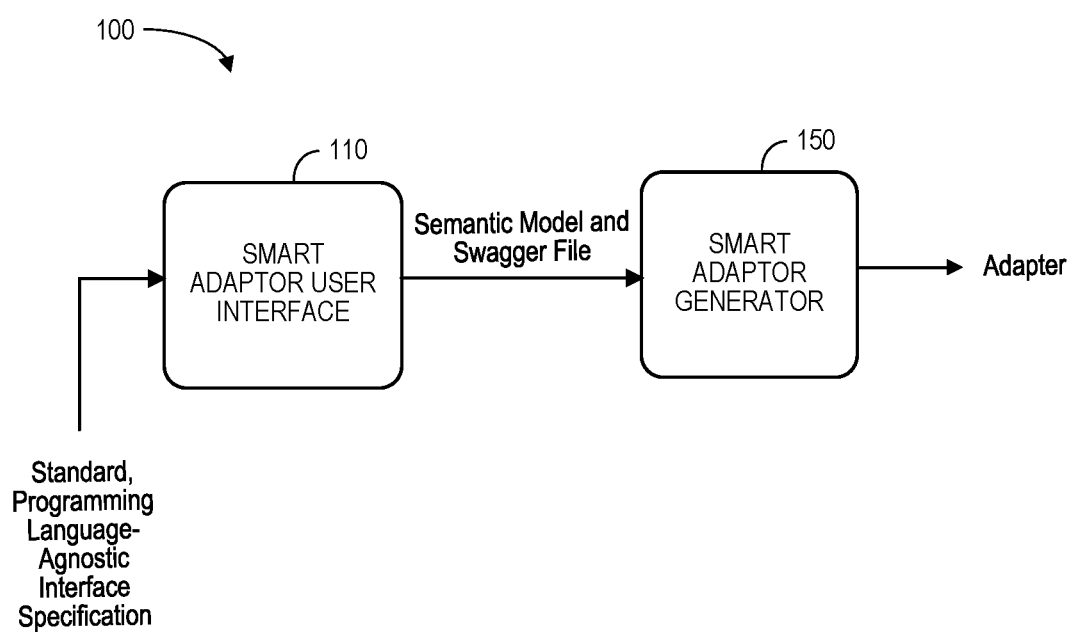
FIG. 1 is a high-level block diagram associated with automatic adapter generation for a cloud-based computing system in accordance with some embodiments.

Embodiments described herein may provide for an automatic generation of a Cloud Integration adapter from a standard, programming language-agnostic interface specification. FIG. 1 is a high-level block diagram associated with automatic adapter generation for a cloud-based computing system 100 in accordance with some embodiments. The system 100 may include a smart adapter UI 110 that receives a standard, standard, programming language-agnostic interface specification (e.g., an OpenAPI document or Swagger file) and communicates with a smart adapter generator 150. In particular, the smart adapter UI 110 may automatically create a semantic model and transmit the model to the smart adapter generator 150 along with, for example, a Swagger file. As used herein, the term "automatically" may refer to a process that is performed with little or no human intervention. The smart adapter generator 250 can then use the semantic model to create and output code for an appropriate adapter.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The smart adapter UI 110 and/or smart adapter generator 150 may store information into and/or retrieve information from various data stores (e.g., a database storing OpenAPI documents), which may be locally stored or reside remote from the smart adapter UI 110 and/or smart adapter generator 150. Although a single smart adapter UI 110 and smart adapter generator 150 are shown in FIG. 1, any number of such devices may be included. Moreover, various devices described herein might be combined according to embodiments of the present invention. For example, in some embodiments, the smart adapter UI 110 and smart adapter generator 150 might comprise a single apparatus. The system 100 functions may be performed by a constellation of networked apparatuses, such as in a distributed processing or cloud-based architecture.

An administrator may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to define mappings or adapter rules) and/or provide or receive automatically generated recommendations or results associated with the system 100.

Figure 2:
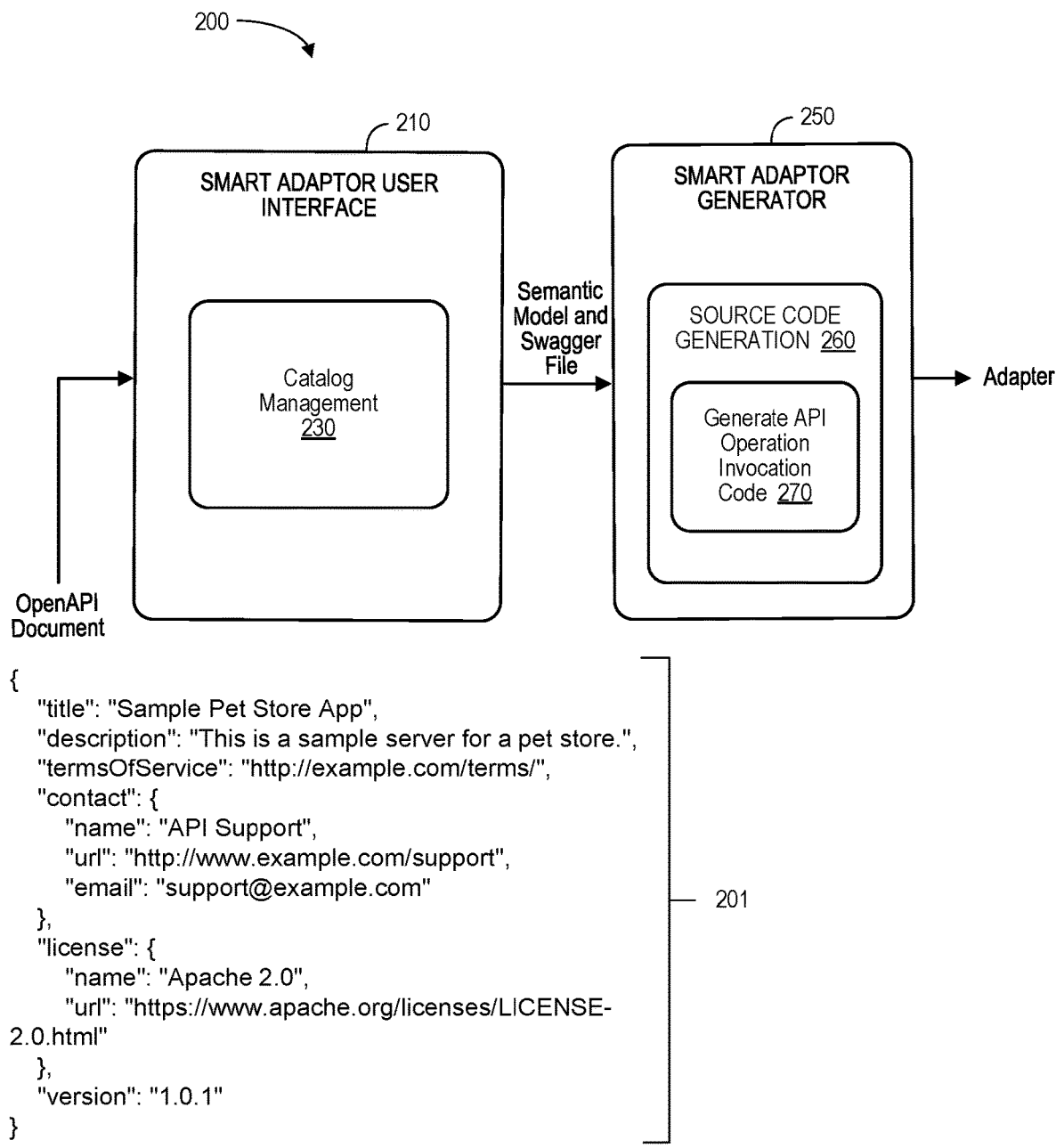
FIG. 2 is another diagram associated with a cloud-based computing system according to some embodiments.

FIG. 2 is another diagram associated with a cloud-based computing system 200 according to some embodiments. In this example, a smart adapter UI 210 receives an OpenAPI document 201 and provides a sematic model to a smart adapter generator 250 along with, for example, a Swagger file. The smart adapter UI 210 may include catalog management 230, such as a process that supports adapter modification, deletion, publishing, etc. for an enterprise (e.g., via an SAP® API Business Hub). The smart adapter generator 250 includes source code generation 260 that creates an adapter based at least in part on the semantic model. The source code generation 260 may, according to some embodiments, automatically generate API operation invocation code 270 for the adapter.

Figure 3:
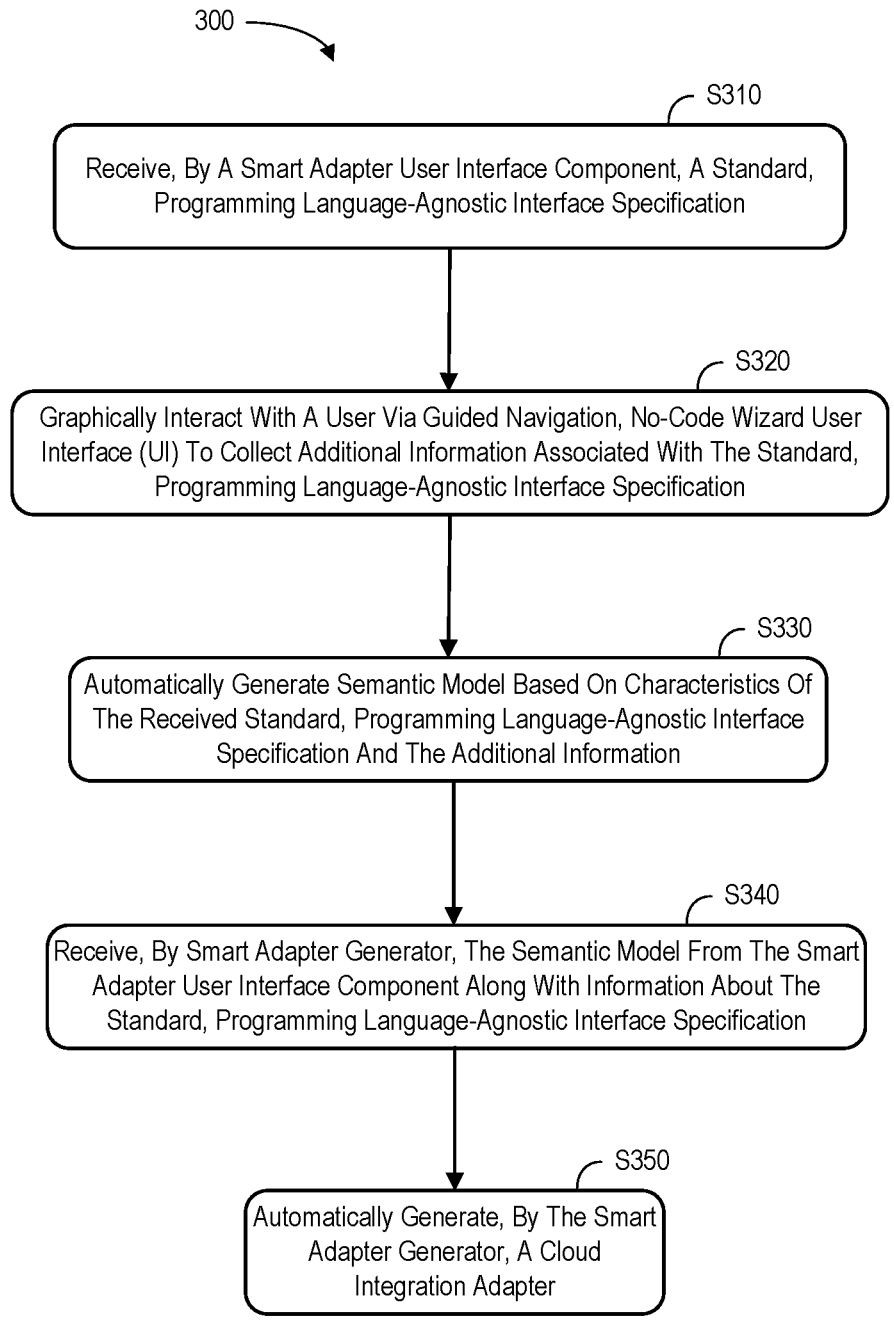
FIG. 3 is an automatic adapter generation method in accordance with some embodiments.

FIG. 3 is an automatic adapter generation method 300 that might be performed by some or all of the elements of the systems 100, 200 described with respect to FIGS. 1 and 2, respectively. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a smart adapter user interface component may receive a standard, programming language-agnostic interface specification. The standard, programming language-agnostic interface specification might comprise, for example, an OpenAPI document, a Swagger file, etc. At S320, the system may graphically interact with a user via a guided navigation, no-code wizard user interface to collect additional information associated with the standard, programming language-agnostic interface specification (e.g., an API name, operations, authentication data, etc.). At S330, the smart adapter UI may automatically generate a semantic model based on characteristics of the received standard, programming language-agnostic interface specification and the additional information. At S340, a smart adapter generator may receive the semantic model from the smart adapter user interface component along with information about the standard, programming language-agnostic interface specification. The smart adapter generation can then automatically generate and output code for a Cloud Integration adapter at S350. In this way, embodiments may provide for the generation of Cloud Integration adapters based on OpenAPI specifications (swagger files) and an intuitive UI wizard with no-code approach. This can help provide a visual development interface and visual modelling experience for non-technical users to generate vendor-specific Cloud Integration adapters in a simple guided navigation approach.

The OpenAPI specification, previously known as the Swagger specification, is a specification for machine-readable interface files for describing, producing, consuming, and visualizing RESTful web services. An OpenAPI definition can then be used by documentation generation tools to display the API, code generation tools to generate servers and clients in various programming languages, testing tools, and many other use cases.

For example, the SAP® Cloud Integration capability of SAP® Integration Suite uses the APACHE™ CAMEL framework, which is an open-source framework that provides message-oriented middleware with a rule-based routing and mediation engine. Cloud Integration web tooling may implement enterprise integration patterns in, for example, Business Process Model Notation ("BPMN") as a semantic model for message-based integration in the integration flow. A sender or receiver side of the integration flow may be powered by the APACHE™ CAMEL components which act as a connector to any third-party systems.

APACHE™ CAMEL components (used at sender or receiver side of the integration flow) can be categorized in to two main types:
  protocol-specific Integration adapters (APACHE™ CAMEL components), such as Hyper-Text Transfer Protocol Secure ("HTTPS"), Simple Object Access Protocol ("SOAP"), Applicability Statement 2 ("AS2"), Applicability Statement 4 ("AS4"), etc.; and
  vendor-specific integration adapters (APACHE™ CAMEL components), such as ARIBA, SUCCESSFACTORS, SALESFORCE®, DROPBOX, etc.

Protocol-specific integration adapters are generic adapters which can communicate with target system Application Programming Interfaces ("APIs") if they support protocol-specific HTTP APIs (e.g., REST-full, SOAP, webservice, etc.). A disadvantage with this type of adapter is that an end user needs to understand the target system HTTP APIs, API operations, and must work with HTTP-based URLs to consume it. This can be complex if the API provider has a large collection of APIs. In this case, a user may be unable take advantage of any API specification that has already been published by third-party connectivity providers systems (which can simplify the consumption experience).

With vendor-specific integration adapters, a user has an understanding of target system HTTP APIs and API operations. Users can explore an API of interest and target API operation in the configuration stage itself (which can make the adapter smart, easy to configure, and simple to consume target system APIs). This may be achieved, for example, by using the following approaches to the consumption of target APIs:
  An OpenAPI specification may be abstracted with a Java-based SDK using a Swagger-based code generator, which can simplify the consumption experience (these API methods may be configured at sender side receiver side of adapter configuration); and
  Adapters may be embedded with intelligence provided by an OpenAPI specification exposed by the target system such that use can easily iterate over the OpenAPI specification and customize the API (or API operation), security, and other aspects of the sender or receiver side of an adapter configuration.

Advantages of vendor-specific adapters may include that they are easy to consume target system APIs (because it embeds knowledge of target system API specifications) and it may be easy to customize sender and receiver side configurations (if the API or API operation need to be changed). Another advantage is that each adapter can have unique branding specific to each vendor that may customize the consumption experience (only those API and API operations required at the sender or receiver side might be exposed for consumption). Still another advantage may be that performance will be better because it is customized (e.g., providing a unique client-side paging implementation, parallelism adoption, custom timeouts, delta queries, etc.).

One disadvantage of vendor-specific adapters is that it can take a substantial amount of time to develop (based on the complexity of APIs and vendor specific implementations). Moreover, additional maintenance might be required for each adapter (because the backend APIs could change).

Cloud Integration provides an Adapter Development Kit ("ADK") for developing integration adapters using the Java programming language and APACHE™ CAMEL component design paradigm. Such an approach may have a number of limitations, including: needing a technical knowledge of APACHE™ CAMEL component development and APACHE™ CAMEL Framework and knowledge of Cloud Integration runtime, runtime APIs and other opensource technologies (APACHE KARAF, the Cloud Integration worker node, the Open Service Gateway initiative ("OSGi"), etc.). Other problems may include a steep learning curve for business users and citizen integrators, missing a low code (or no-code) approach for adapter developers, a lack of "one-click" experiences from development until the publishing of adapters in an SAP® API Business Hub, and a missed guided approach for adapter development. Further, such approaches may require eclipse-based tooling and the fact that only development is only possible for people with Java programming knowledge.

Embodiments described herein may provide a smart adapter generation tool that can generate a vendor-specific integration adapter from OpenAPI specifications (e.g., a Swagger file) in a no-code visual development interface and visual modelling in a guided approach. Advantages of using this approach for building integration adapters include the fact that users don't need previous coding experience and to build an integration adapter using a no-code approach. Moreover, the approach provides a visual development interface and visual modelling to enable non-technical users to build integration adapters in a simple guided navigation way. In addition, embodiments may build vendor-specific integration adapters that embeds the knowledge a vendor exposes in OpenAPI specifications (e.g., API, API operations, security configuration data, etc.). The approach may also hide the complexity of understanding ADK concepts as it generates ADK-specific metadata and ADK an compliant integration adapter binary (a Component Metadata Descriptor ("CMD"), a properties file, an APACHE™ *ARIES* Subsystem ("ESA") file, etc.). Such a smart adapter generation tool may also hide the complexity of APACHE™ CAMEL component development (e.g., component interfaces, endpoints, processors, an Enterprise Integration Pattern ("EIP"), etc.) and provide lifecycle management for integration adapters (e.g., download adapter to local filesystem, publish to an API hub, deploy to Cloud Integration tenant, modify adapter in case of backend OpenAPI specification changes, provide private/public catalog with local persistence and state update, etc.).

Another advantage of some embodiments described herein is that it may generate and injects Java source code logic to invoke API operations at receiver side of the adapter. This logic might, for example, take care of: exception handling for APACHE™ CAMEL exchange operations (reading from exchange headers/properties or writing into an exchange body); serialization and/or de-serialization of complex objects; handling of a security authorization code; API operation method invocation; API initialization code; API and API operation detection logic at runtime; customizing APACHE™ CAMEL processor handling logic; etc.

Some embodiments may also expose API and API operations in user friendly naming conventions (e.g., user defined aliases) at the configuration side of an adapter. Moreover, a consumer of the adapter may have target system understanding while configuring the adapter because it embeds the API specification knowledge. This might help the API consumption experience because the user can be aware (in the configuration property sheet) about the following adapter aspects: which APIs are exposed by the backend; which operations each API provides; what a typical API operation invocation method signature looks like; security token handling for calling endpoints; etc. In general, a faster learning curve and quicker turnaround time may be provided for business users who develop integration adapters. This can help bridge a gap between an integration flow developer (typically a Cloud Integration consultant) and an integration adapter developer (e.g., a Java developer with APACHE™ CAMEL expertise). As a result, an integration flow developer can generate adapters (which are required for third-party connectivity) without depending on an integration adapter developer.

Figure 4:
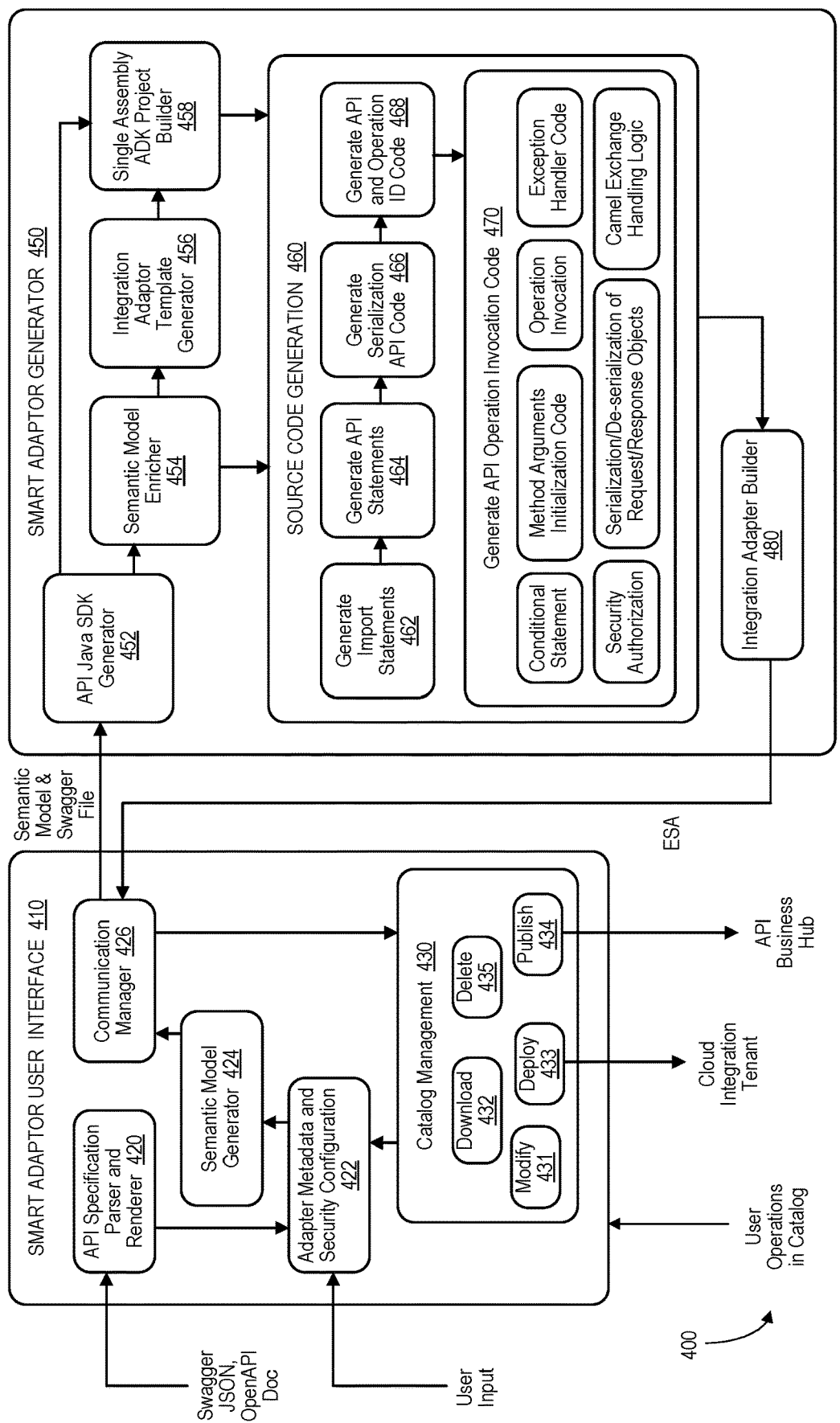
FIG. 4 is a more detailed representation of an adapter generation system according to some embodiments.

FIG. 4 is a more detailed representation of an adapter generation system 400 according to some embodiments. The system 400 includes a smart adapter UI 410 and a smart adapter generator 450. The smart adapter UI 410 might be developed, for example, on SAP® User Interface ("UI") 5 framework (an HTML5 framework for creating cross-platform, enterprise-grade web applications in an efficient way) and provide wizard-based approach for building Cloud Integration adapters. The smart adapter UI 410 may capture the OpenAPI specifications or documents of a target system (either with a user upload or a target URL or Uniform Resource Identifier ("URI") if the Swagger JSON file is available). The smart adapter UI 410 may customize the customer provided OpenAPI specification Swagger file (e.g., to select API, API operation of interest to be part of adapter receiver side operations, aliasing API operations with user friendly names, etc.).

Figure 5:
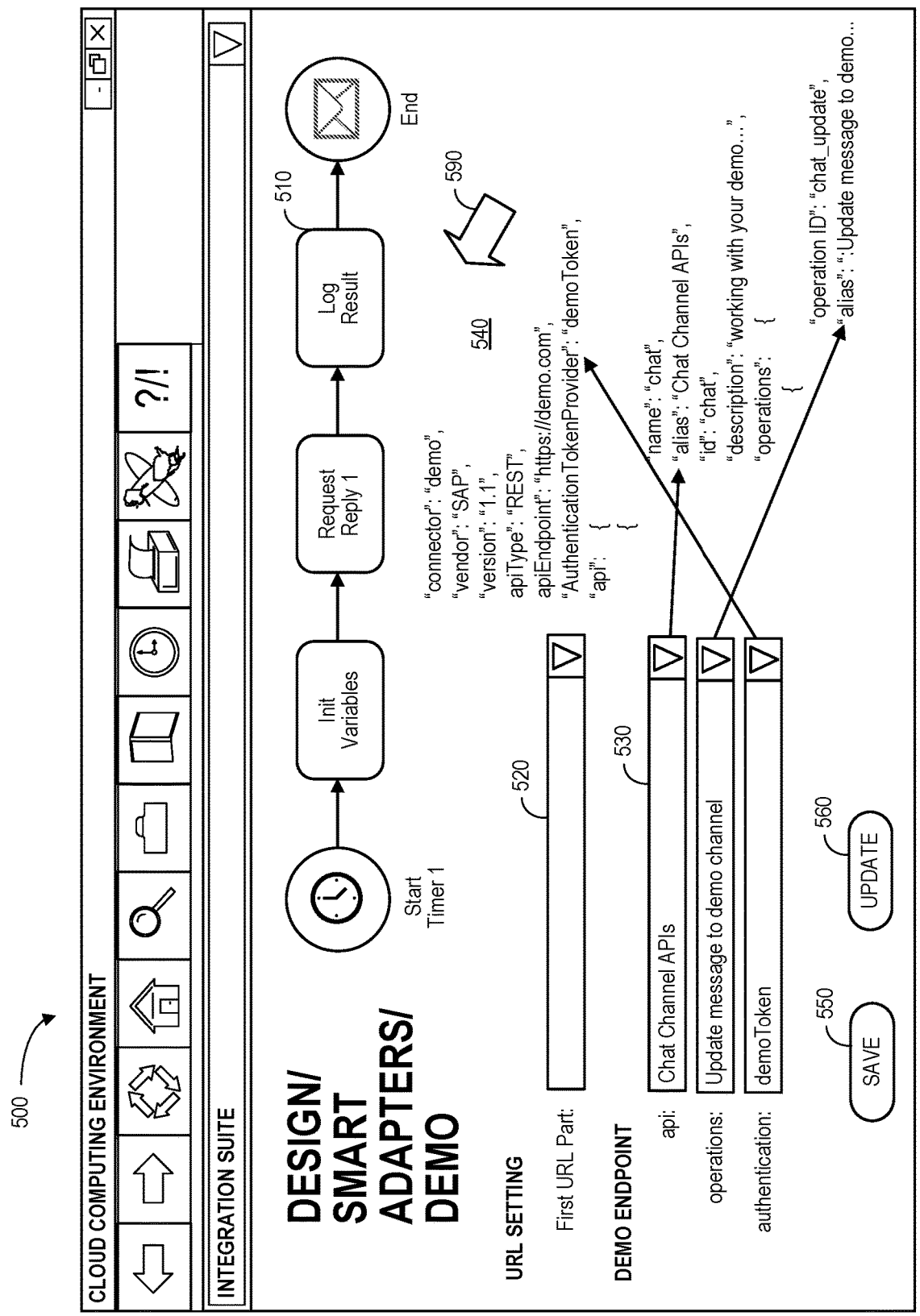
FIG. 5 is an example of a smart adapter design display in accordance with some embodiments.

The smart adapter UI 410 may also capture user inputs on the adapter metadata (e.g., name, vendor, version, API and API operation alias names, security token, etc.) and generate a semantic model by analyzing user provided input data and the OpenAPI specification file. For example, FIG. 5 is a smart adapter design display 500 in accordance with some embodiments. The display 500 can be used to create an integration flow 510 and providing a URL setting 520 and endpoint data 530 to create adapter code 540. Moreover, "Save" 550 and "Update" 560 icons may be selected (e.g., via touchscreen or a computer mouse pointer 590) to control operation of the display 500. In addition, the smart adapter UI 410 may trigger the generation of an integration adapter by communicating with the smart adapter generator 450 (which is based on Java) and manage the lifecycle of integration adapter with a private/public integration adapters catalog (deploying to an integration tenant, publishing to an API hub, modifying the integration adapter, etc.).

Figure 6:
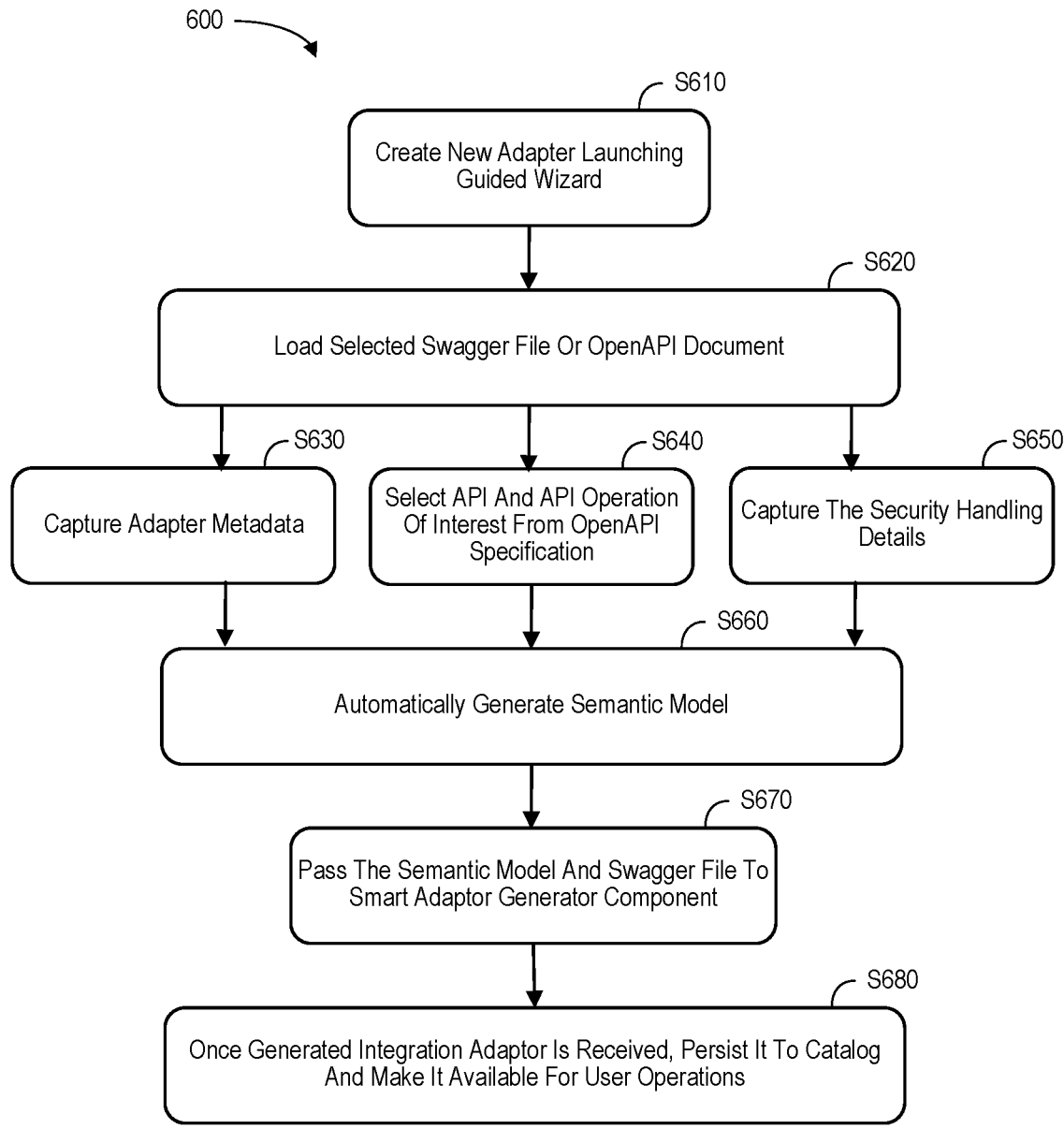
FIG. 6 is a smart adapter UI 410 adapter development method according to some embodiments.

FIG. 6 is a smart adapter UI 410 adapter development method 600 according to some embodiments. At S610, user may begin creating a new adapter by launching a guided wizard application. At S620, an input source may be selected to load the selected Swagger file or OpenAPI document. The system may then capture the adapter metadata at S630, select the API and API operation of interest from the OpenAPI specification at S640, and capture the security handling details at S650. Next, the system may automatically generate the semantic model at S660 and pass the semantic model and Swagger file to the smart adapter generator 450 at S670. Moreover, in some embodiments, when a generated integration adapter is received it can be persisted to a catalog to be made available to other users at S680.

Figure 7:
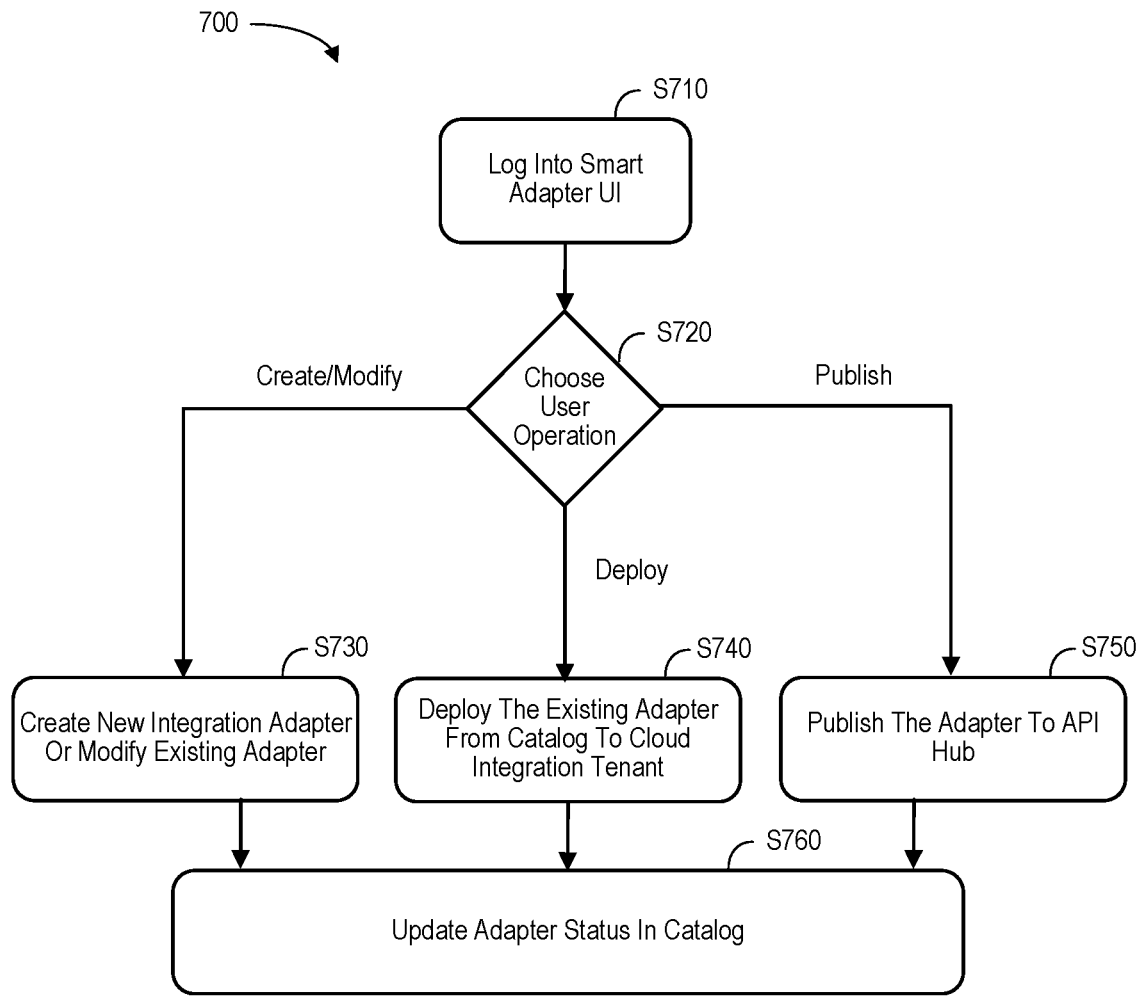
FIG. 7 is a smart adapter UI 410 adapter lifecycle management method in accordance with some embodiments.

FIG. 7 is a smart adapter UI 410 adapter lifecycle management method 700 in accordance with some embodiments. At S710, a user logs into the smart adapter UI 410. At S720, the user may choose a user operation. If the user selects "create/modify" at S720, the system creates a new integration adapter (or modifies an existing adapter) at S730. If the user selects "deploy" at S720, the system deploys the existing adapter from a catalog to a cloud adapter tenant at S740. If the user selects "publish" at S720, the system publishes the adapter to an SAP® API Business Hub at S750. The adapter status may then be updated in the catalog at S760.

Figure 8:
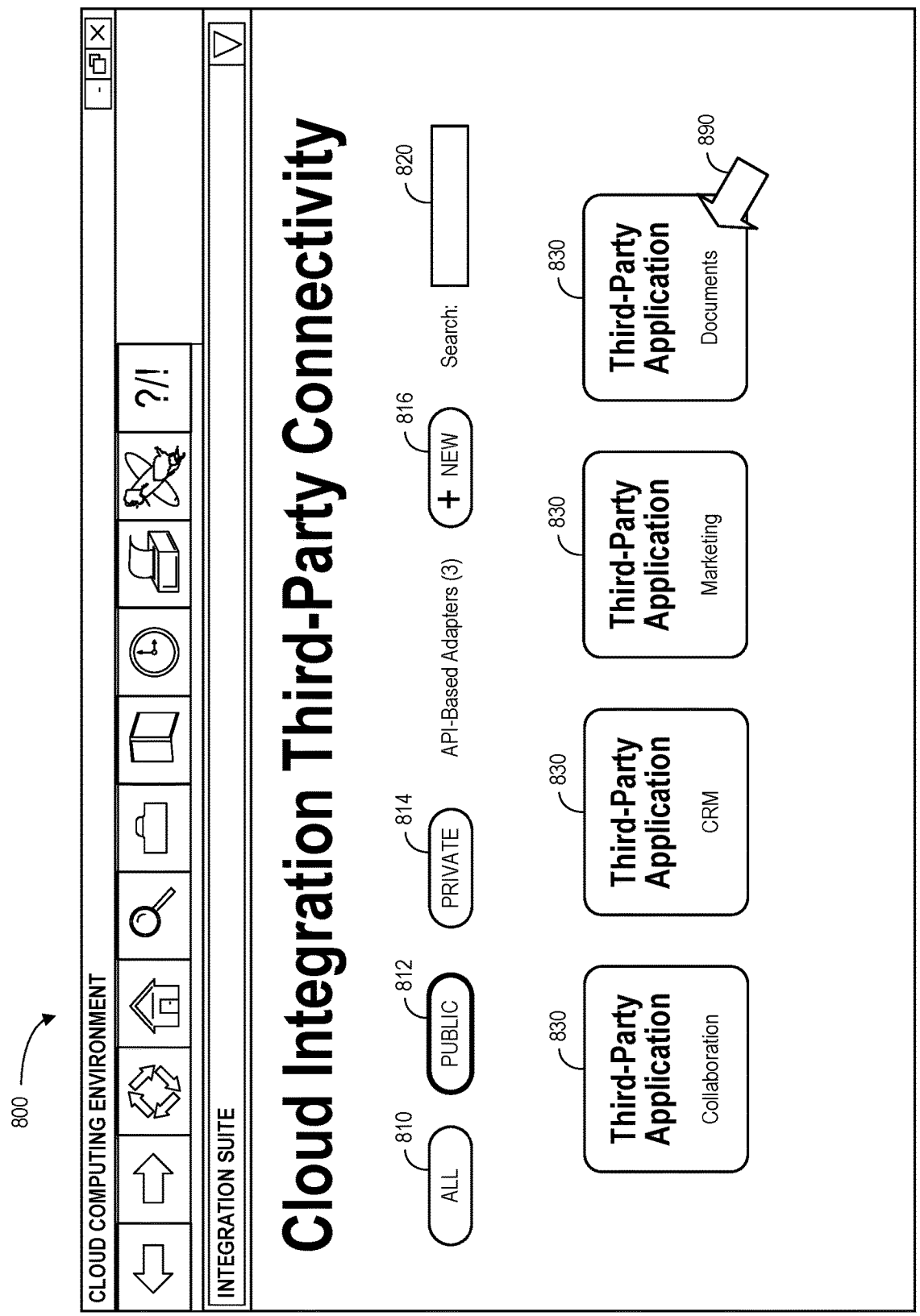
FIG. 8 is a smart adapter UI application display according to some embodiments.
Figure 9:
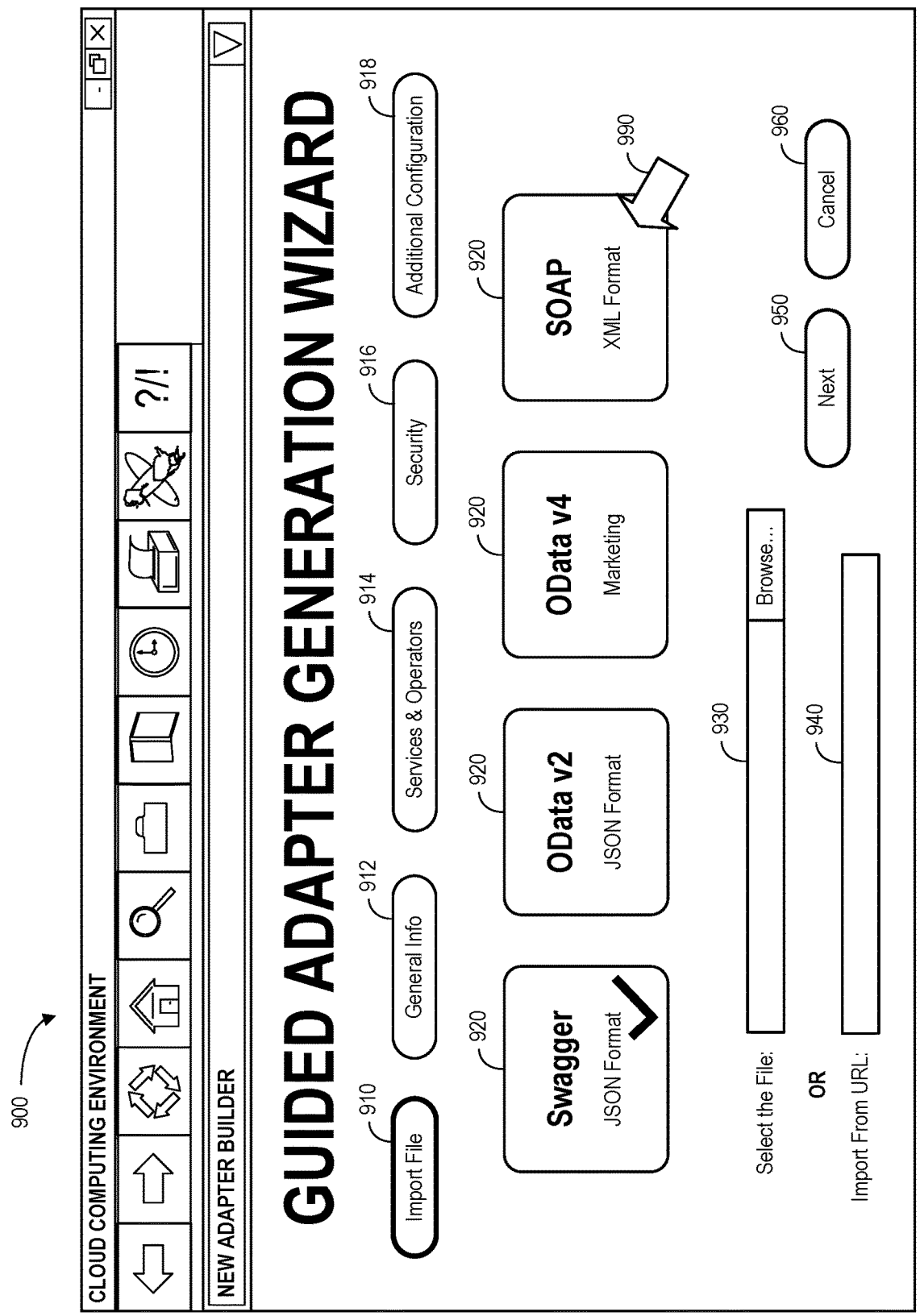
FIG. 9 is a guided adapter generation wizard display in accordance with some embodiments.

FIG. 8 is a smart adapter UI application display 800 according to some embodiments. The display 800 might let a user select adapters with third-party connectivity from a catalog. The user might view "All" API-based adapters 810, "Public" adapters 812 or "Private" adapters 814. The display 800 may also be used to create a "New" adapter 816 or to perform a text search 820 looking for a particular adapter. A set of available adapters are displayed as tiles 830 that can be selected by the user (e.g., via a touchscreen or computer mouse pointer 890). FIG. 9 is a guided adapter generation wizard display 900 in accordance with some embodiments. The wizard display 900 is "guided" in that it takes a user through a series of steps to create an adapter: "Import File" 910, "General Information" 912, "Services and Operators" 914, "Security" 916, and "Additional Configuration" 918. Initially, the user may select a tile 920 representing the type of file being imported (e.g., by choosing a file type such as Swagger via a computer mouse pointer 990). The user may also enter select a file name 930 or provide a URL address 940 for the import process. The display 900 also lets the user progress to the "Next" 950 step (e.g., "General Information" 912) or "Cancel" 960 the adapter creation process.

Figure 10:
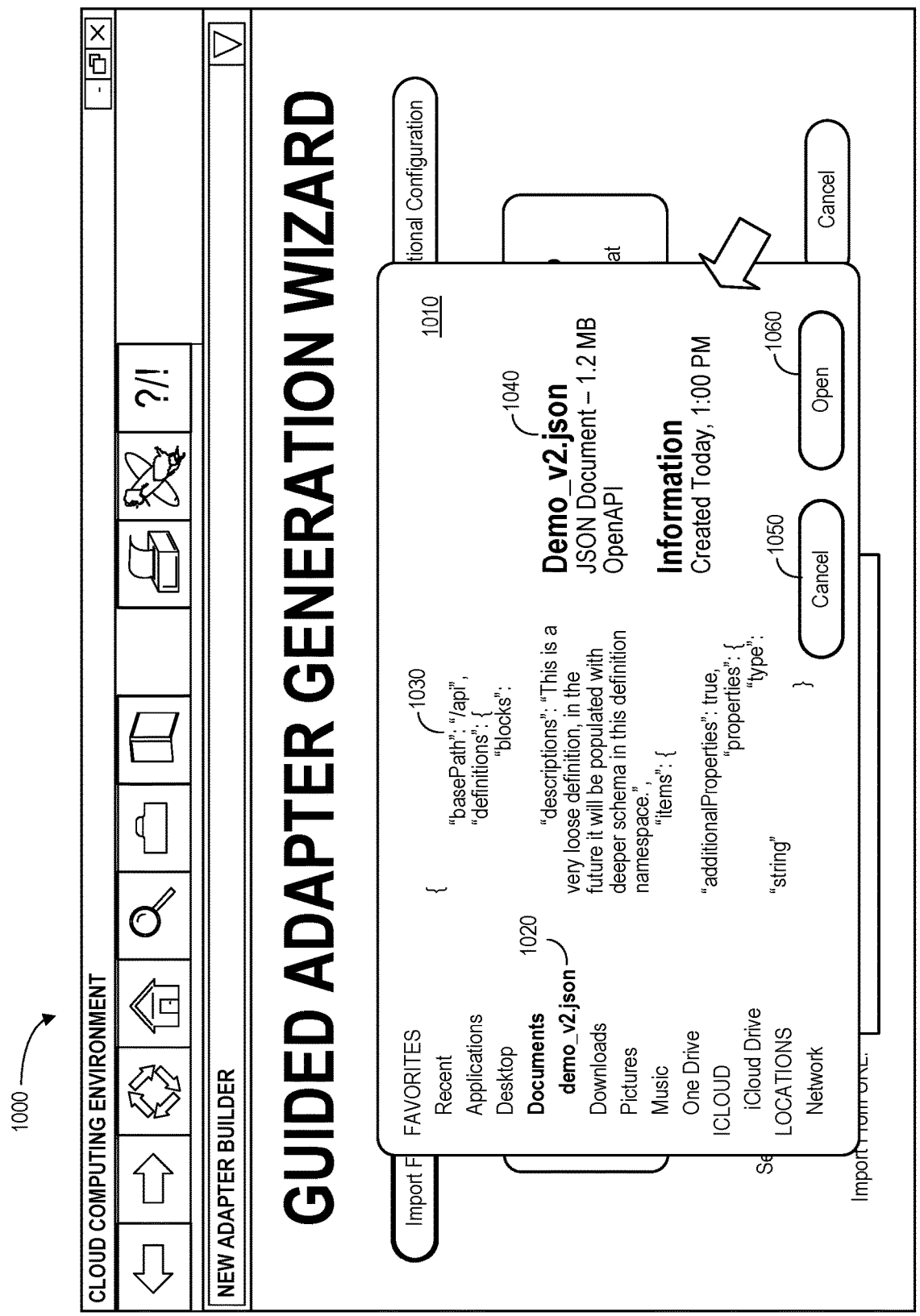
FIG. 10 is a display with further details according to some embodiments.
Figure 11:
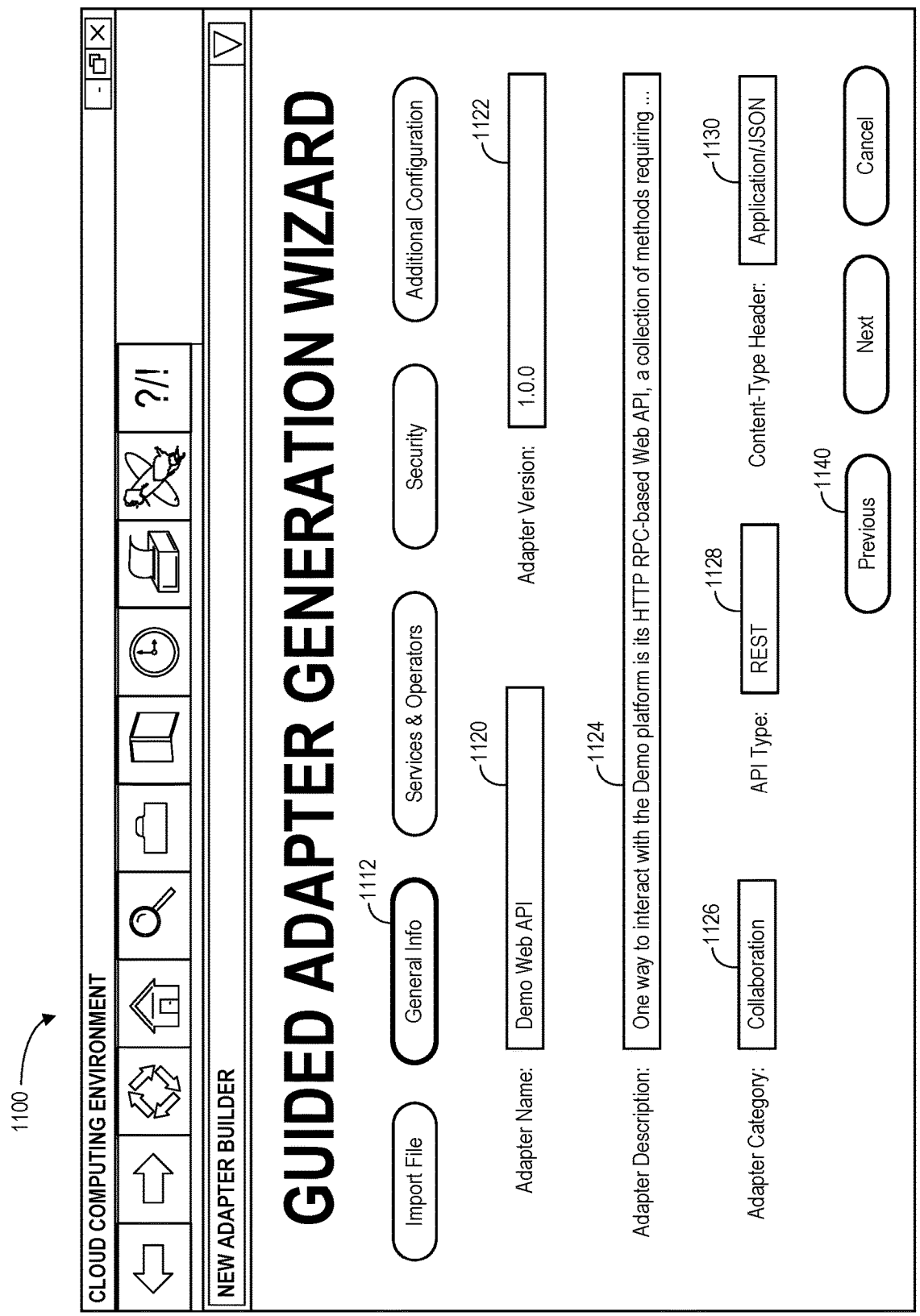
FIG. 11 is an adapter metadata and security configuration module display in accordance with some embodiments.
Figure 12:
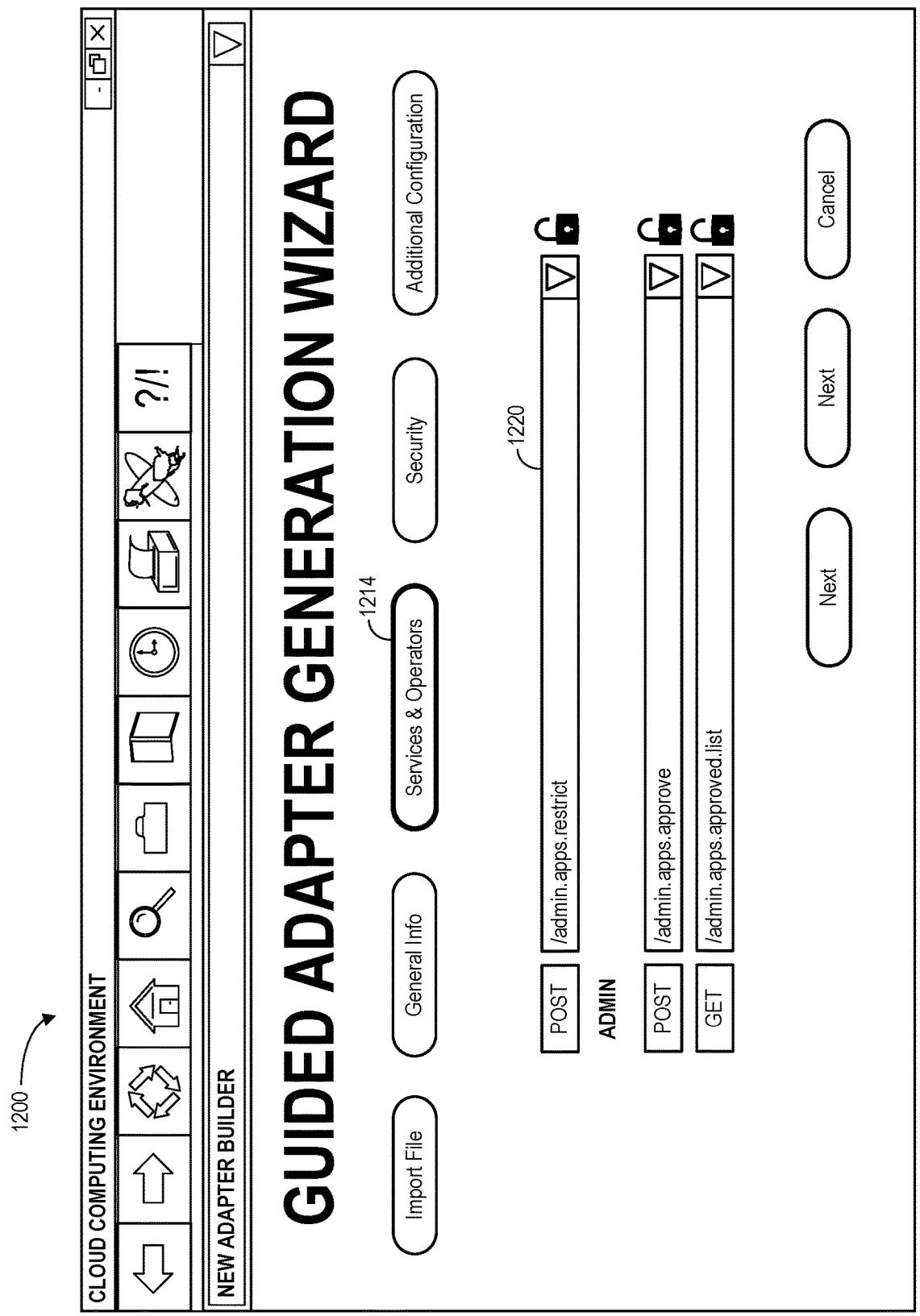
FIG. 12 is a new adapter builder display according to some embodiments.

Referring again to FIG. 4, the smart adapter UI 410 may include an API specifications parser and renderer 420 module that analyzes the input source (e.g., a demo Swagger file) and rendering information about the input. For example, FIG. 10 is a display 1000 with further details about a file according to some embodiments (e.g., a popup window 1010 that is displayed when a tile 920 is selected). The window 1010 includes a file location 1020, the Swagger code 1030, and summary information 1040 (e.g., indicating the type of file that is selected, when it was modified or created, etc.). The use may then decide to "Cancel" 1050 the import or to "Open" 1060 the file. The smart adapter UI 410 also includes an adapter metadata and security configuration 422 module. FIG. 11 is an adapter metadata and security configuration module display 1100 associated with the "General Information" 1112 step of the wizard. The display 1100 captures a user's input for general information about adapter metadata such as adapter name 1120, vendor, logo, version 1122, description 1124, API category 1126 or type 1128, endpoint host, documentation, header 1130, etc. The user can also select to go back to the "Previous" 1140 step in the guided wizard. FIG. 12 is a new adapter builder display 1200 that might be associated with the "Services and Operations" 1214 step of the wizard process. The display 1200 may be used to enter services and operations data 1220 for "post" or "get" elements to help a user understand what is in the Swagger file.

The smart adapter UI 410 may further include a semantic model generator 424 module that is responsible for generating a semantic model by analyzing user captured input and the Swagger specification file. This semantic model may be a JSON based adapter definition file, which stores details such as:
- adapter metadata (e.g., adapter name, vendor, version, type, endpoint, logo image details, etc.); and
- API details (e.g., name, id, alias, etc.) and API operations details (operation id, operation alias name).

An example Swagger file 1300 is shown in FIG. 13, including information about contacting a demo adapter 1301, in accordance with some embodiments. FIG. 14 is a semantic model 1400 (also referred as an adapter semantic model definition), including a chat update operation 1401, may be used by different modules of smart adapter UI 410 and/or smart adapter generator 450 to generate API Java SDK, create an integration adapter project template, generate the source code for an APACHE™ CAMEL producer side implementation for executing API operations logic, etc. The semantic model 1400 may get enriched in the mart adapter generator 450 component with the knowledge from the API Java SDK.

Figure 15:
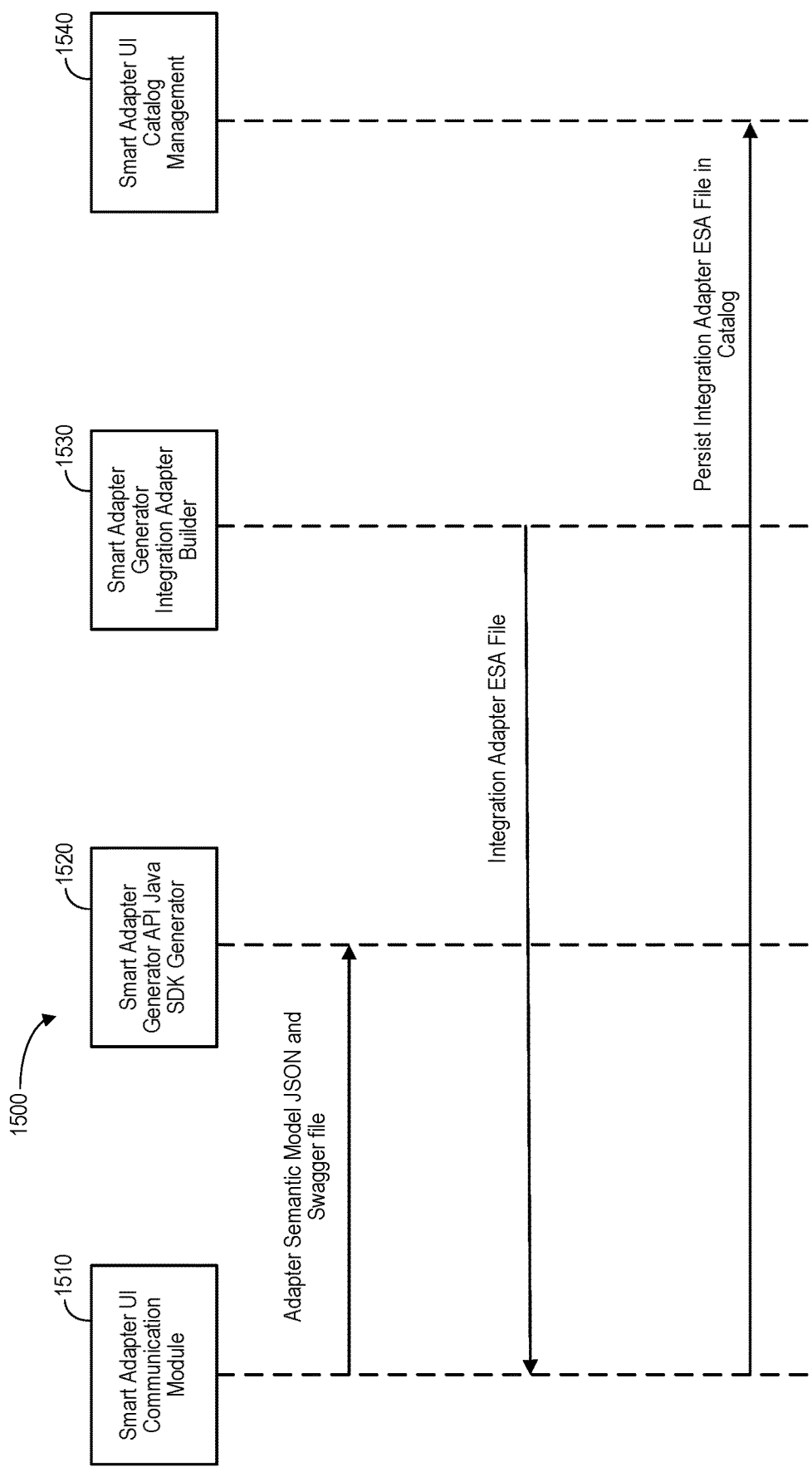
FIG. 15 is a communication module information flow in accordance with some embodiments.

The smart adapter UI 410 may also include a communication manager 426 that is responsible for handling inbound and outbound communication with the smart adapter generator 450 component. As a part of outbound communication, the communication manager 426 sends the JSON based semantic model and target system (third-party connectivity provider) and Swagger file (e.g., OpenAPI specifications) to the smart adapter generator 450, which in turn builds the Cloud Integration adapter user unattended. The communication manager 426 also receives the generated adapter file Open Service Gateway Initiative ("OSGI") Subsystem ("ESA"), such as an APACHE™ ARIES subsystem file, from the smart adapter generator 450 and hands it over to a catalog management 430 component which stores it in a catalog. FIG. 15 is a communication module information flow 1500 in accordance with some embodiments. A smart adapter UI communication module 1510 sends the adapter semantic model JSON and Swagger file to a smart adapter generator API Java SDK generator 1520. A smart adapter generator integration adapter builder 1530 then sends an integration adapter ESA file to the smart adapter UI communication module 1510. Finally, the smart adapter UI communication module 1510 persists the integration adapter ESA file in the catalog by sending data to smart adapter catalog management 1540.

Catalog management 430 may be responsible for storing Cloud Integration adapters (along with a current status) in the catalog and may let users perform various operations on adapters in the catalog:
- modify/extend 431: lets a business user modify the adapter (e.g., if the OpenAPI specifications changes, the API or API operations underwent changes in the target API provider system, the user wants to change API and API operations to be supported as part of sender or receiver operations of integration flow, etc.);
- download 432: lets a business user download the integration adapter ESA file into a local filesystem;
- deploy 433: lets a business user deploy the integration adapter into a Cloud Integration tenant;
- publish 434: lets a business user publish the integration adapter into an SAP® API Business Hub (after the integration adapter is published, it will be available in the API hub as a third-party connector for Cloud Integration); and
- delete 435: lets an administrator user delete the integration adapter from the catalog.

Figure 16:
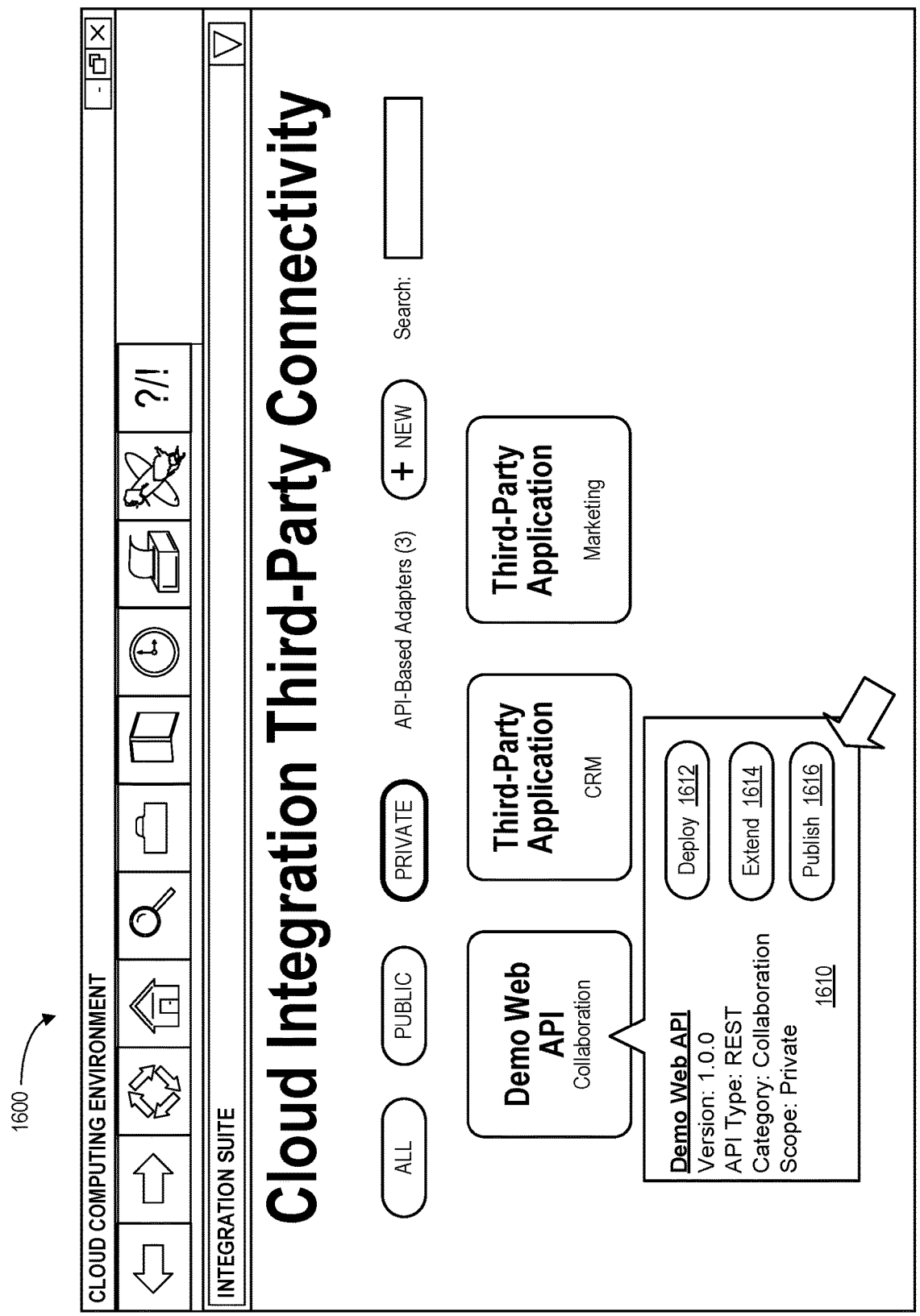
FIG. 16 is a catalog management display according to some embodiments.

The private catalog holds the adapters which are yet to be published on to the SAP® API Business Hub. After an adapter is published, it is moved to public catalog. Once the integration adapter generated and sent to catalog management 430 from the communication manager 426, the adapter is automatically listed in the private catalog. FIG. 16 is a catalog management display 1600 with adapter details 1610 that might be used to "Deploy" 1612, "Extend" 1614, or "Publish" 1616 an adapter according to some embodiments.

The smart adapter generator 450 is responsible for generating a Cloud Integration adapter from the Swagger file (or OpenAPI specification) and the adapter semantic model definition (e.g., a JSON file). The Cloud Integration adapter is a Java based APACHE™ CAMEL component with SAP® Adapter Development Kit ("ADK") provided extensions (such as CMD, properties file, monitoring jar, packaged as APACHE ARIES subsystem file, etc.). The smart adapter generator 450 also generates the integration adapter (user unattended) and sends the final ESA binary file to the smart adapter UI 410 (which hosts the same in the catalog). The main operations of the smart adapter generator include:
- an API Java SDK generator 452 (client side) that uses a Swagger code generator to generate API Java Client-side SDK from OpenAPI specifications provided by the target system;
- a semantic model enricher 454 to enrich a smart adapter UI 410 generated semantic model with details captured from API Java SDK source code (e.g., API operation Java method signatures, method return types, arguments, argument data types, Java classes where these methods are implemented, etc.);
- an integration adapter template generator 456 to generate an ADK compliant integration adapter project template, generate all ADK specific metadata (e.g., CMD, property file and customizing project package structure, APACHE™ CAMEL component specific attributes, etc.);
- a single assembly ADK project builder 458 to combine results from the API Java SDK generator 452 and the integration adapter template generator 456, create a customized POM, and build an ADK compliant Java project (which then generates the Cloud Integration adapter ESA file);
- source code generation 460 for APACHE™ CAMEL producer side implementation that generates and injects the source code (which is capable of invoking API operation from the receiver side of the adapter based on user input in the integration scenario execution); and
- an integration adapter builder 480 to generate the Cloud Integration adapter ESA file using the APACHE™ MAVEN configured ADK plugin from the integration adapter project that was previously generated (and send the ESA file to the smart adapter UI 410 for listing in the catalog).

Figure 17A:
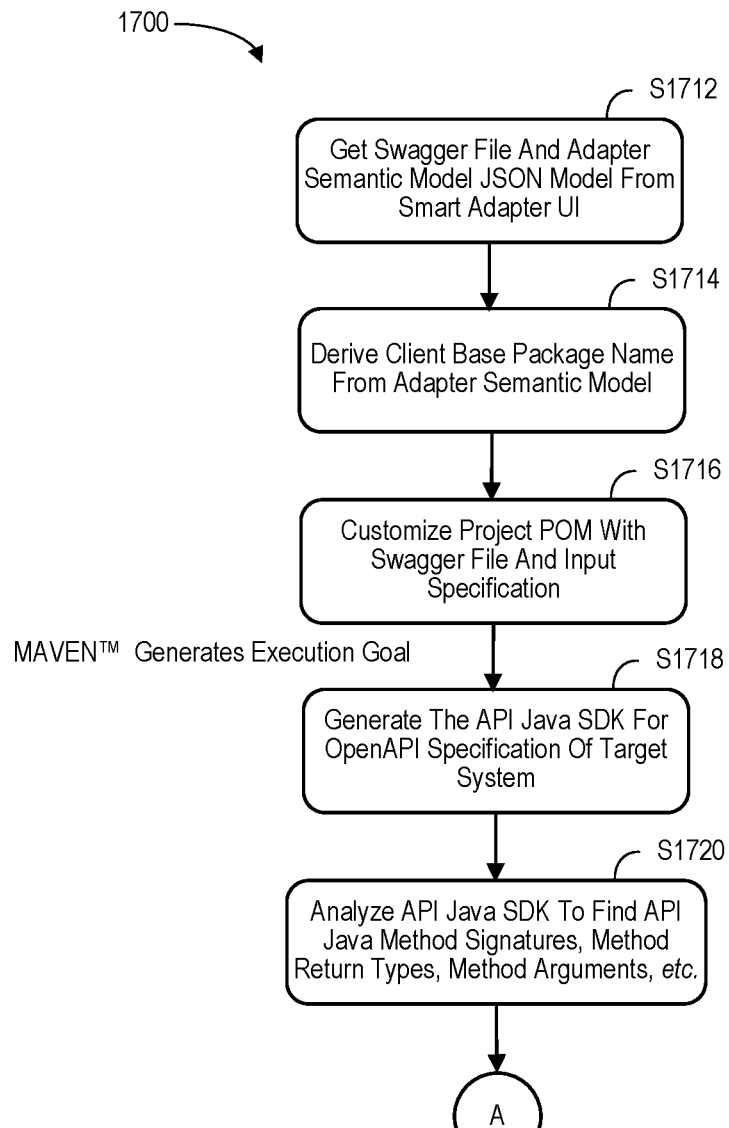
FIGS. 17A and 17B are a smart adapter generator method in accordance with some embodiments.
Figure 17B:
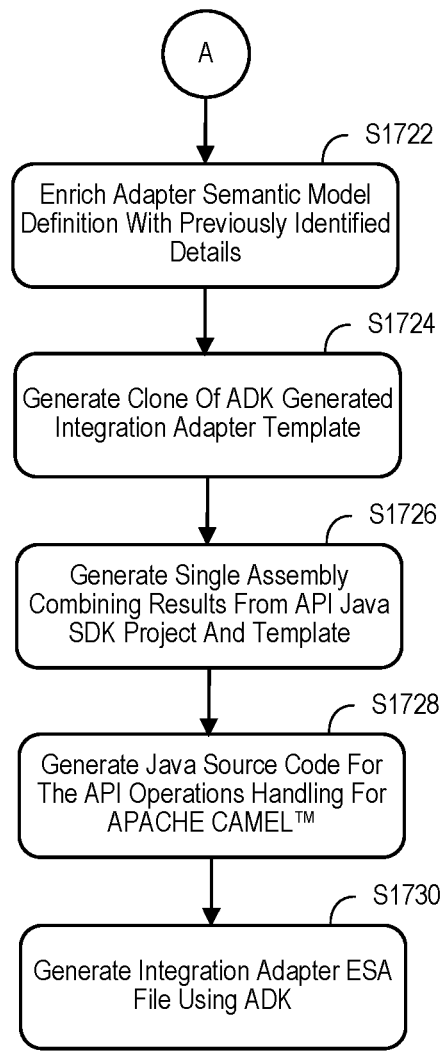

FIGS. 17A and 17B are a smart adapter generator method 1700 in accordance with some embodiments. As shown in FIG. 17A, the method 1700 includes getting the Swagger file and adapter semantic model JSON file from the smart adapter UI 410 at S1712. At S1714, the system may derive the client.base.package.name from the adapter semantic model. This provides the root package structure under which all generated API Java source code would reside. At S1716, the system may customize the project POM with the Swagger file as an input specification and configuration data as a Swagger code generator plugin configuration for generating the Java SDK. At this point, MAVEN may generate an execution goal. Upon an invocation of a project POM with a MAVEN invocation request, at S1718 the Swagger code generator may generate the API Java SDK for the OpenAPI specification of the target system. At S1720, the system may analyze the API Java SDK to find API Java method signatures, method return types, method arguments, method argument data types, classes where these Java methods are implemented, etc. These methods are Java function signatures of API operations which are captured as part of the adapter semantic model in the adapter UI. As shown in FIG. 17B, the method 1700 further includes enriching the adapter semantic model definition with previously identified details such as method signature name, method return types, method calling arguments and its data types, Java classes where these methods are implemented, etc. at S1722. At S1724, the system may generate a clone of an ADK generated integration adaptor template, customize the template from adapter details from the semantic model definition (e.g., connector name, vendor, version, etc.) and generate adapter CMD (UI property sheet metadata) by looking at the semantic model definition (mainly API and API operations data). At S1726, the system may generate a single assembly by combining results from the API Java SDK project and the ADK generated integration adaptor project template (which was customized using the semantic model). This may help ensure that customized POM generated which produces the single Cloud Integration adapter binary ESA file. At S1728, the system may generate Java source code for the API operations handling for the APACHE™ CAMEL producer side implementation and inject it into Java Class (which extends the default producer interface. The system can then generate the integration adapter ESA file using the ADK at S1730.

The API Java SDK generator 452 uses a Swagger code generator opensource framework to generate the API client-side Java SDK. To make this generation automatically happen (user unattended), it is provided as a MAVEN build plugin in the project POM (whose configuration will be done based on data from the adapter semantic model). For example, demo.json may provide the OpenAPI specifications and client. base.package.name provided in the package under which all the API Java SDK sources are generated. The client.base.package.name may be, according to some embodiments, passed as POM property as follows:

```
<properties>
    <client.base.package.name>com.sap.swaggerapi.client.
    demoAPI</client.base.package.name>
</properties>
```

This module uses a MAVEN POM invocation approach to execute Swagger code gen MAVEN build plugin execute goal and trigger the API Java SDK generation logic.

The semantic model enricher 454 enriches the adapter semantic model generated by the smart adapter UI 410 with the API Java SDK generated source details such as Java method signature name, method return type, method signature arguments, method signature argument data types, Java classes where these method signature are implemented, etc. This enrichment may help integration adapter project template creation and Java source code generation, which we will do in end for invoking API operations and handling the response gracefully (populating message exchange output body).

Figure 18:
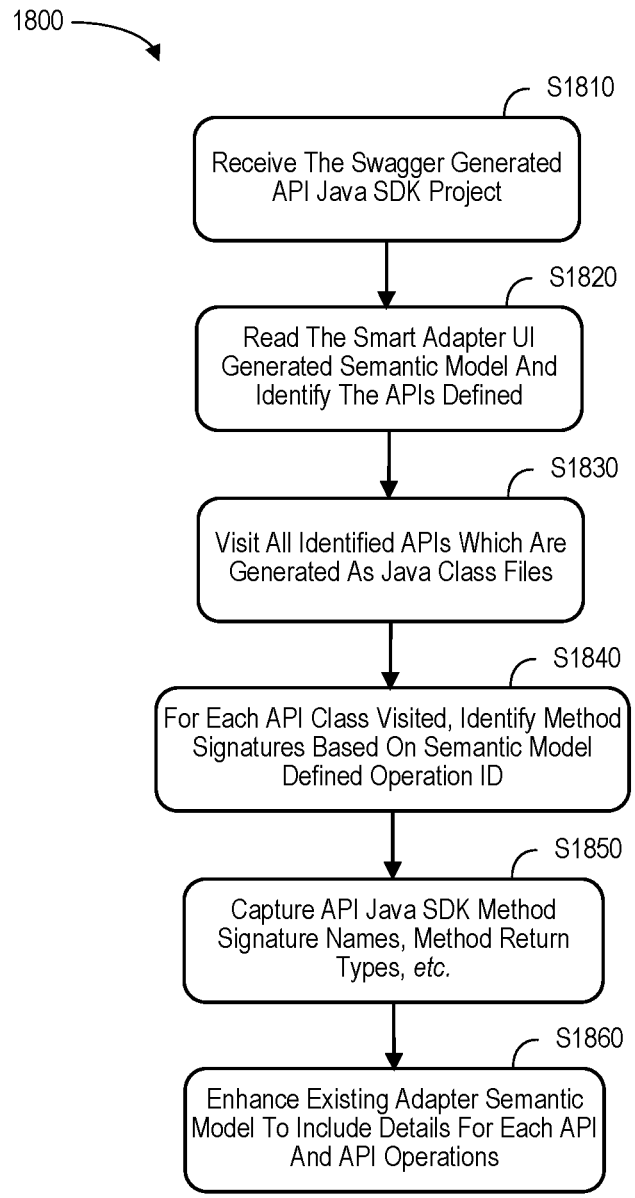
FIG. 18 is a semantic model enricher method according to some embodiments.

FIG. 18 is a semantic model enricher method 1800 according to some embodiments. At S1810, the Swagger generated API Java SDK Project is received. The system may then read the smart adapter UI 410 generated semantic model and identify the defined APIs at S1820. At S1830, the system may visit all of the identified APIs which are generated as Java class files in the <clienlbase.package.name>API package using the SimpleFileVisitor Java file visitor pattern. For each API Class visited, the system may identify method signatures based on the semantic model defined operation identifier at S1840. At S1850, the system may capture the API Java SDK method signature names, method returns types, method arguments, method argument data types, etc. by calling the override visitFile function of the SimpteFileVisitor pattern (which reads every line of the API specific Java class file). At S1860, the system may enhance the existing adapter semantic model to include details for each API and API operation (e.g., methodProviderClass, methodName, methodRetunType, methodArguments, etc.).

Note that API operations were defined in the adapter semantic model generated from the smart adapter UI 410. Java function signatures may be generated for API operations (e.g., under package com.sap.demoapi.client.demoAPI.api and ChatAPI Class as output of previous step of API Java SDK generation). These API operation details may be captured from the API Java SDK source code and enrich the adapter semantic model definition. The system might, according to some embodiments, introduce new fields such as methodProviderClass, methodName, methodReturnType, methodArguments (name, data type) which may help Java code generation to invoke API operations at the receiver side of the integration flow. To Capture these details, the system may scan the <client.base.package.name>API package (e.g., con). sap.swaggerapi.client.demoAPI.api). The SimpleFileVisitor Java interface may be extended to visit all the APIs specific Java classes generated by the Swagger code-generator. Under each API java class file, the system may override the visitFile function to capture Java method signatures and other details related to each method visited.

Figure 19:
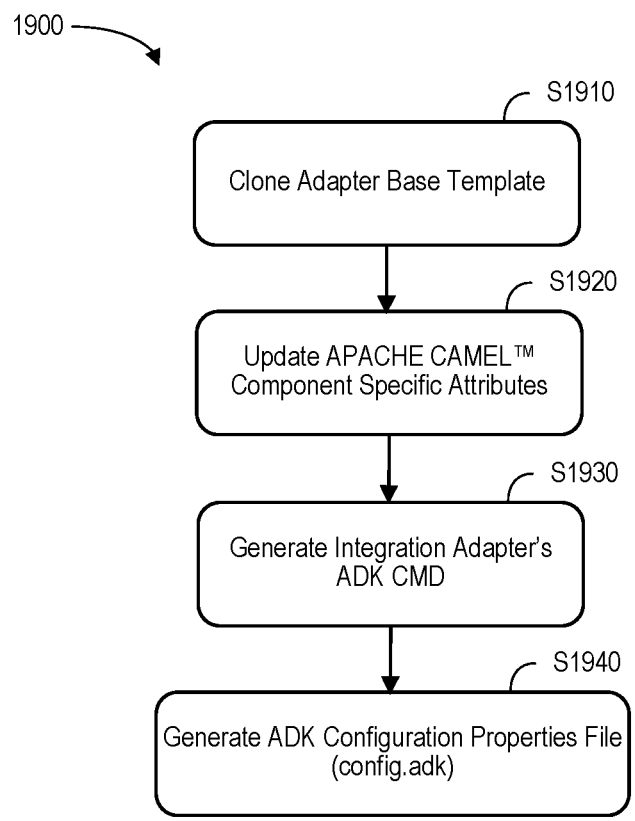
FIG. 19 is an integration adapter template generator method in accordance with some embodiments.

The integration adapter template generator 456 may generate a Cloud Integration adapter project template based on the adapter base template and the adapter semantic model definition. The output of the adapter template generator 456 may be an ADK compliant Cloud Integration adapter project, which has all APACHE™ CAMEL component classes to support component lifecycle (e.g., component, endpoint, producer, consumer, etc.), the ADK specific metadata files (e.g., CMD and properties file), and the customized project POM with the ADK plugin for building adapter project. FIG. 19 is an integration adapter template generator method 1900 in accordance with some embodiments. At S1910, the system may clone the adapter base template to the Cloud Integration adapter project template based on the adapter semantic model definition. Note that the adapter base template has plain APACHE™ CAMEL component interfaces and the clone operation may take the connector name attribute from adapter semantic model definition, refactor the Java package, class file names, etc. The concept of SimpleFileVisitor Java interface may be used to visit all the base template java packages and classes, and the refactoring operation may use overridden preVisitDirectory and preVisitFile operations.

At S1920, the system may update the APACHE™ CAMEL Component specific attributes in the Cloud Integration adapter project template. This operation changes APACHE™ CAMEL component endpoint URI Scheme of DefaultPollingEndpoint, Endpoint implementation. Another change may be done to APACHE™ CAMEL component services, which provide UriEndpointComponent APACHE™ CAMEL component implementation class. When APACHE™ CAMEL component initialized in an APACHE™ CAMEL Route, this class may be instantiated first.

At S1930, the system may generate the integration adapter's ADK CMD (UI property sheet metadata file, such as metadata.xml) by looking within the adapter semantic model definition file (API, API operations, security token, adapter name, vendor version, etc.). This operation generates the ADK CMD (metadata.xml), which basically has all of the sender and receiver side UI configuration parameters of the integration adapter. This operation may look into all of the required parameters from adapter semantic model (e.g., connector name, vendor, version, security token, APIs and API operations, etc.) to generate the ADK CMD. This generates various ADK CMD parts such as sender side configuration, receiver side configuration, attribute metadata for all UI fields and component metadata information by analyzing the adapter semantic model definition that was generated in previous steps. For example, a demonstration adapter configuration UI at a receiver side of adapter in an integration flow and associated mapping with the adapter semantic model definition (e.g., API, API operations, and security token). According to some embodiments, an operations field captures all the API operations defined for selected API in the semantic model. Similarly, for API UI field, the system may capture all the APIs defined in the adapter semantic model definition. Note that the UI property sheet at the sender side and receiver side of the integration adapter may be fixed, so the system can populate the API, API operations, and security token details from the adapter semantic model JSON definition. At S1940, the system may generate the ADK configuration properties file (e.g., config.adk). This step generates the ADK configuration properties file in the integration adapter project. These config.adk property values may again be taken from semantic model definition of the adapter.

The single assembly ADK project builder 458 may generate a single integration adapter project assembly by combining the projects generated by the API Java SDK generator 452 and the integration adapter template generator 456. The API Java SDK generator 452 may generate the target system's API Java client SDK using Swagger codegen. The single assembly ADK project builder 458 module combines both project results which may involve:

copying API Java client SDK project's java packages into the integration adapter template generator 456 project structure; and copying MAVEN dependencies of API Java client SDK project to the integration adapter template generator 456 project POM.

Note that the API Java client SDK may use some third-party library dependencies for a RestTemplate HTTP client, for JSON object handling, etc. These dependencies may be copied to the integration adapter template generator 456 project POM. The system may also inject some custom plugin logic to the integration adapter template generator 456 project POM to achieve objectives of generating the ESA file:

embed transitive dependencies along with adapter jar; and add Cloud Integration ADK MAVEN plugin (to validate project generated ADK artifacts and create ESA archive which is used as Cloud Integration adapter). Note that the final POM file generated by the single assembly ADK project builder 458 may be used to create an ESA file (integration adapter binary) as output on a MAVEN build.

Figure 20:
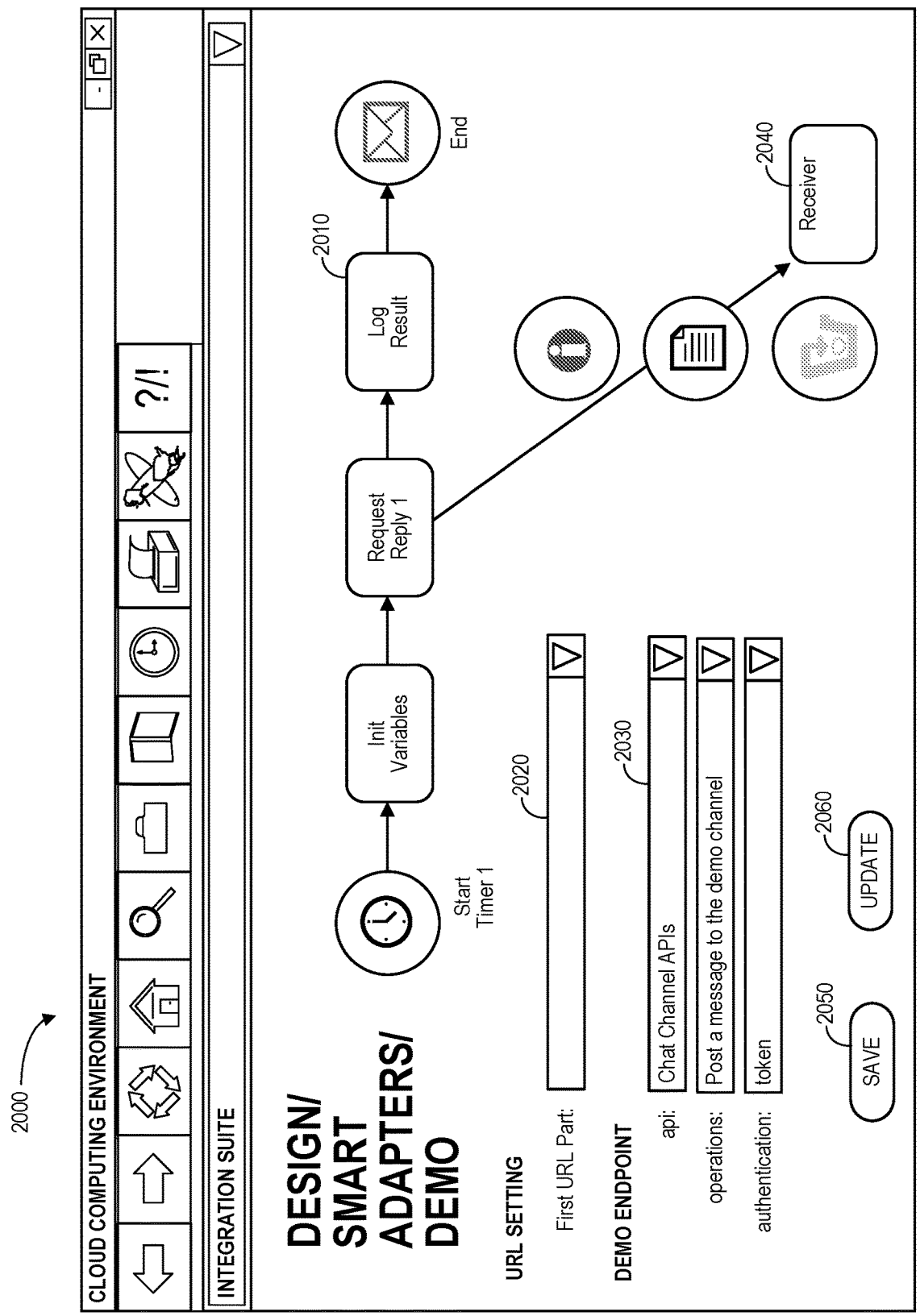
FIG. 20 is a source code generation display according to some embodiments.

The source code generation and injection for APACHE™ CAMEL producer/consumer implementation 460 is responsible for generating the Java source code for calling API operations from the sender or receiver side of the integration adapter by looking into the adapter semantic model definition. The receiver side of Integration adapter uses APACHE™ CAMEL producer side of the implementation, whereas sender side of integration adapter uses APACHE™ CAMEL consumer side of the implementation. FIG. 20 is a source code generation display 2000 according to some embodiments. The display 2000 includes an integration flow 2010 to a receiver 2040. A user may enter a URL setting 2020 and/or a demo endpoint 2030 and select to "Save" 2050 or "Update" 2060 the information. When an APACHE™ CAMEL route generated by the Cloud Integration for receiver 2040 side of the adapter operation, all of the integration adapter UI property sheet input parameters selected by user (e.g., API, operations, authentication, etc.) may be passed as arguments to URI part of APACHE™ CAMEL route. During the execution of the integration flow 2010 (CAMEL context) in the Cloud Integration runtime, when the URI of the APACHE™ CAMEL route gets executed, a JAVA class is called which extends APACHE™ CAMEL DefaultProducer interface. For example, process( )) function which is an APACHE™ CAMEL processor may be executed as a part of receiver 2040 side function logic. Note that the system may generate source code in this class, for invoking API operations based on arguments passed from the adapter receiver side UI configuration.

Figure 21:
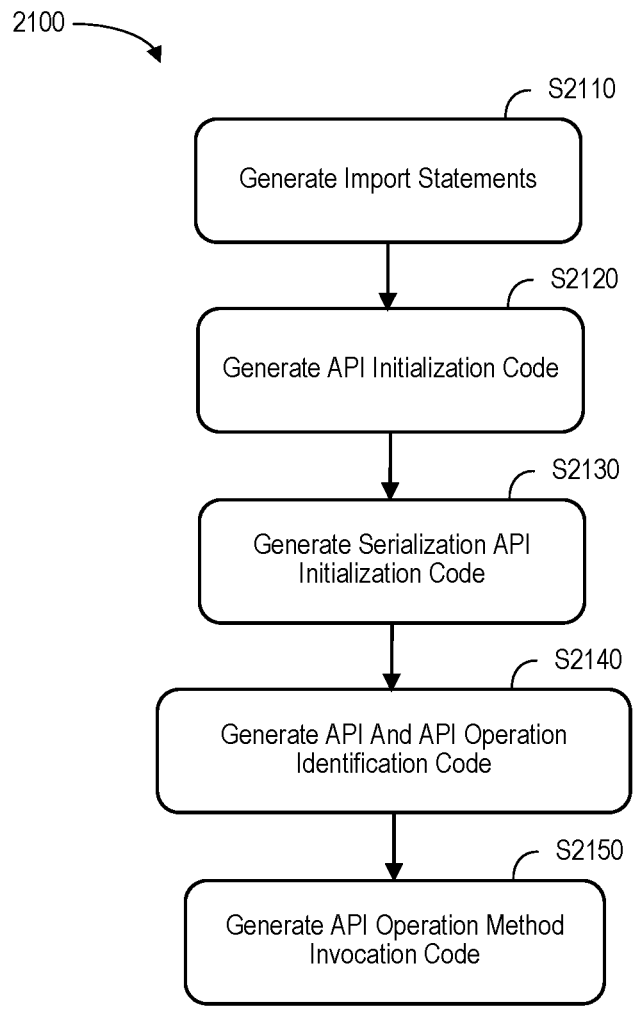
FIG. 21 is a semantic model analysis method in accordance with some embodiments.

Source code generation may happen by analyzing the adapter semantic model. FIG. 21 is a semantic model analysis method 2100 in accordance with some embodiments. At S2110, the system may generate import statements (e.g., via element 462 of FIG. 4). This imports the entire packages generated by the API Java SDK generator 452, which is required to work with API and invoke API operations. The first step may be to import all of the packages and underneath classes of the API Java SDK Generator 452. As a next step, the system may import a serialization and/or de-serialization library (which are used to handle complex Java objects). As a last step, the system may import Java utility classes by analyzing the return type of operations defined in the semantic model definition (this may be required if method return type is not basic Java datatype). The final result of this step may be to generate statements (e.g., injected into a demoProducer class which provides APACHE™ CAMEL producer side implementation for handing receiver side logic).

At S2120, the system may generate API initialization code (e.g., via element 464 of FIG. 4). This initializes all of the APIs referenced in the adapter semantic model definition, which is later used for API operation invocations. That is, this code may be injected into APACHE™ CAMEL processor process( )) function which is part of the CAMEL producer implementation class. At S2130, the system may generate serialization API initialization code (e.g., via element 466 of FIG. 4). Note that the system may use Gson for serializing and/or de-serializing complex Java objects which are either consumed or produced by API operations. At S2140, the system may generate API and API operation identification code (e.g., via element 468 of FIG. 4). Note that the API and API operation identification code facilitate execution of API operation, which is passed as input from the adapter configuration UI during integration flow execution. Note that in APACHE™ CAMEL component endpoint implementation, class provides URI parameters, which maps with configuration parameters passed from the adapter UI property sheet. According to some embodiments, the system may retrieve configuration values passed in the APACHE™ CAMEL route URI just by querying APACHE™ CAMEL endpoint URI parameters.

At S2150, the system may generate API operation method invocation code (e.g., via element 470 of FIG. 4). This step generates logic for invocation API operations which are implemented in the API Java client SDK. In some cases, S2150 generates conditional statements to control execution of API operations, and generates logic specific to each operation based on operation signature, operation return type, operation arguments, etc. This generation may be based on the adapter semantic model definition which provides details about API, API operations, which need to be supported in the sender and receiver side operations of the integration adapter. This might involve, for example, generating a conditional statement for controlling execution of API and API operations. These conditional statements control which API and API operation need to be executed when APACHE™ CAMEL Processor is called during message processing of integration flow execution. S2150 may also involve generating method (API operation) arguments initialization code. This involves identifying all of the arguments needed to call an API operation from the adapter semantic model (and the system may define and initialize those arguments with data passed from a message exchange). If the system encounters complex Java objects or Plain Old Java Objects ("POJOs"), then serialization is done to construct those objects before passing them as method arguments. S2150 may also involve generating exception handling code (adding generic try catch exception handling for API operation invocation).

S2150 may also involve generating security authorization header handling code. Note that a security token for handling authorization may be defined in the Cloud Integration as a security artifact. A user may provide a name of security artifact in the adapter configuration UI, and this security token may be initialized in the integration flow steps with the key store API provided by the Cloud Integration runtime. This security token shall also be initialized with hardcoded bearer token or bas64 encoded basic authentication user/password string in the integration flow steps logic. Moreover, the user provided security token will be assigned to authentication endpoint URI configuration parameter of the integration adapter. This user provided security token may be passed as an authorization header in the generated source code by getting its name from the endpoint configuration parameter.

S2150 may also involve generating an operation invocation call. This step generates an API operation invocation call, which will call the API Java SDK functions corresponding to the API operation selected by the user in the adapter configuration either at sender or receiver side. Required information for generating the method invocation signature may be derived from the adapter semantic model. S2150 may also involve handling serialization and/or de-serialization of requests and/or response objects. If the API operation has return type and if it is complex Java object, then results need to be deserialized to a plain JSON string.

Also, if an API operation method argument is a complex Java object, then the system may construct that from an exchange body for passing it as an API operation argument. Note that de-serialization is not required for some API operations that do not have any return type. S2150 may also involve generating APACHE™ CAMEL exchange handling logic. This step generates source code for handling APACHE™ CAMEL exchange, which is passed on to processor function during message processing of the integration flow execution. If there is no response from API operation invocation, the system may simply put standard response code "202 Accepted" as a standard response.

The final result of source code generation and injection for APACHE™ CAMEL producer side implementation may be used by the integration adapter builder 480. This step generates the Cloud Integration adapter (ESA) file by doing a MAVEN build on the final integration adapter project prepared in previous steps. This MAVEN build is triggered using a MAVEN invocation request approach which makes it automated (e.g., without user intervention). Note that third-party dependencies may be embedded within the integration adapter jar itself (which are not provided by the Cloud Integration runtime worker node). Moreover, after building the ESA file, it can be sent to the smart adapter UI 410 communication manager 426, which will persist the file in the adapters private catalog (so that business users can do various operations such as deploy, publish, modify, delete, and download depending on user roles).

Figure 22:
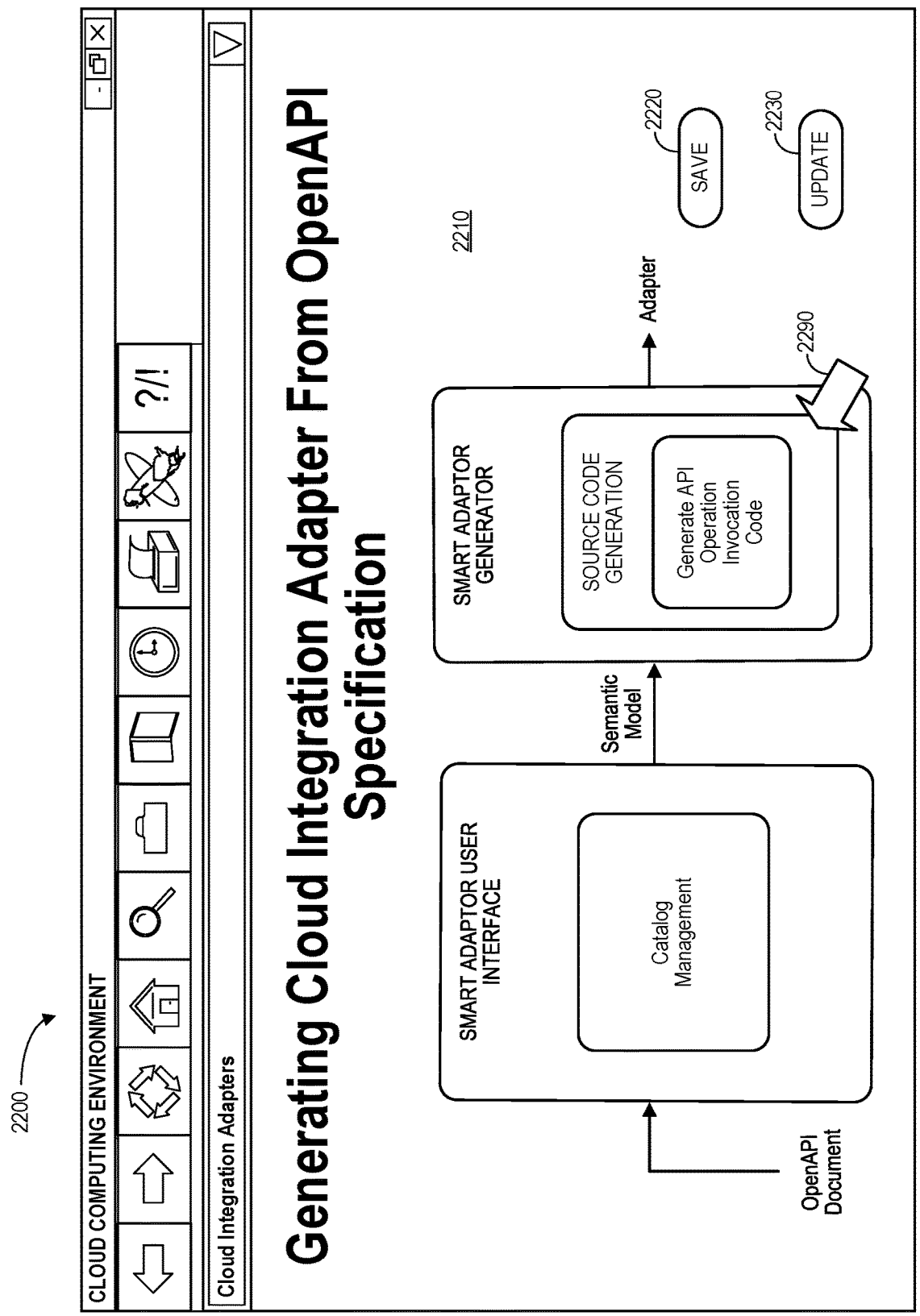
FIG. 22 is an automatic adapter generation display according to some embodiments.

FIG. 22 is an automatic adapter generation display 2200 according to some embodiments. The display 2200 includes a graphical representation 2210 or dashboard that might be used by an operator or administrator to configure automatic adapter generation (e.g., for a cloud computing environment). In particular, selection of an element (e.g., via a touchscreen or computer mouse pointer 2290) might result in the display of a popup window that contains more detailed data. The display 2200 may also include a user selectable "Save" icon 2220 to store configurations and/or system mappings (e.g., to an OpenAPI datastore or adapter catalog) and an "Update" icon 2230 to adjust values as appropriate.

Figure 23:
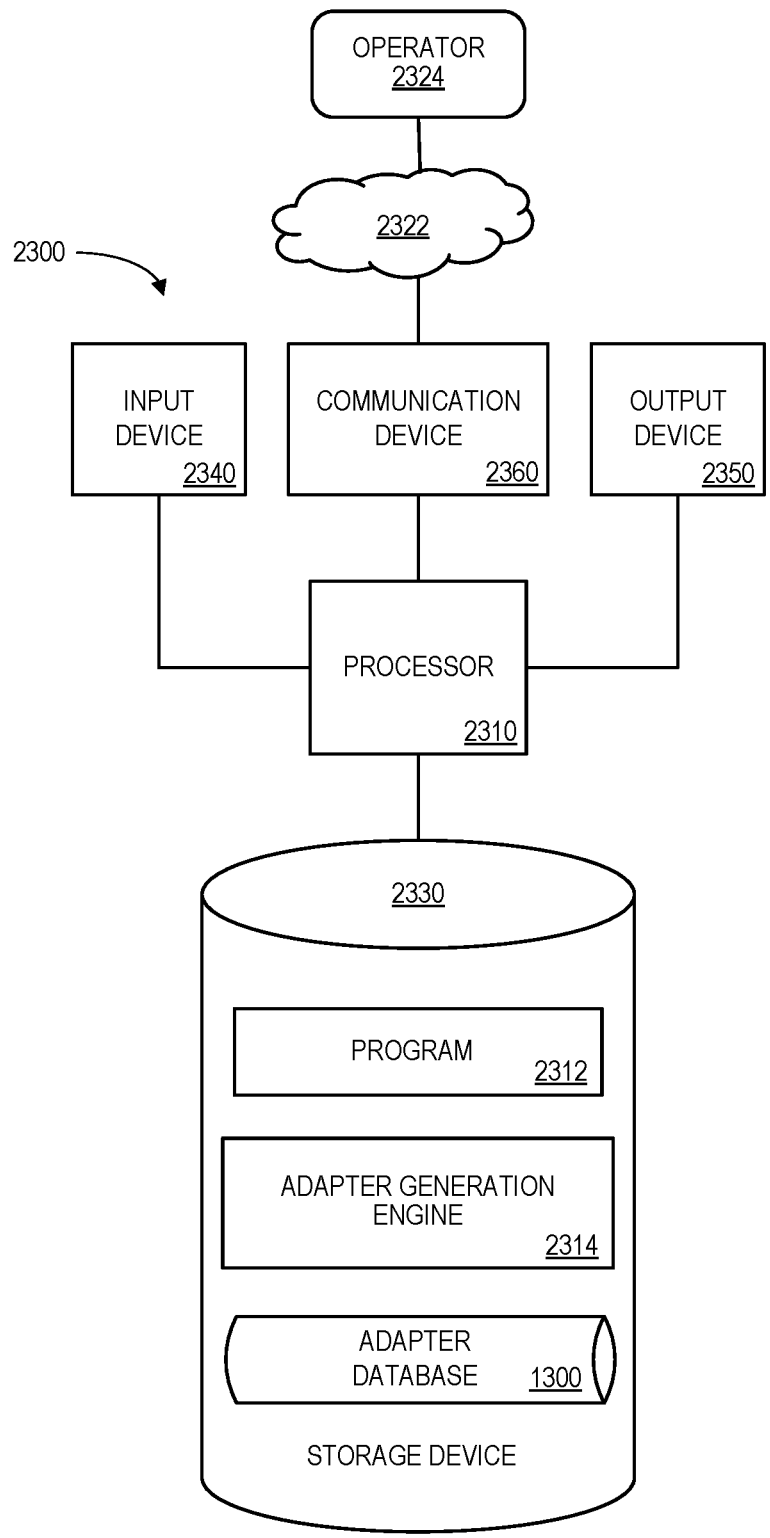
FIG. 23 is an apparatus or platform according to some embodiments.

Note that the embodiments described herein may be implemented using any number of different hardware configurations. For example, FIG. 23 is a block diagram of an apparatus or platform 2300 that may be, for example, associated with the systems 100, 200, 400 of FIGS. 1, 2, and 4, respectively (and/or any other system described herein). The platform 2300 comprises a processor 2310, such as one or more commercially available Central Processing Units ("CPUs") in the form of one-chip microprocessors, coupled to a communication device 2360 configured to communicate via a communication network (not shown in FIG. 23). The communication device 2360 may be used to communicate, for example, with one or more operators 2324 (e.g., via a communication network 2322), system administrators, etc. The platform 2300 further includes an input device 2340 (e.g., a computer mouse and/or keyboard to input, create and/or manage automatic adapter generation) and/or output device 2350 (e.g., a computer monitor to render a display, transmit recommendations, and/or create reports about integration adapters, warnings, log files, etc.). According to some embodiments, a mobile device and/or PC may be used to exchange information with the platform 2300.

The processor 2310 also communicates with a storage device 2330. The storage device 2330 may comprise any appropriate information storage device, including combinations of magnetic storage devices (e.g., a hard disk drive), optical storage devices, mobile telephones, and/or semiconductor memory devices. The storage device 2330 stores a program 2312 and/or adapter generation engine 2314 for controlling the processor 2310. The processor 2310 performs instructions of the programs 2312, 2314, and thereby operates in accordance with any of the embodiments described herein. For example, the processor 2310 may receive a standard, programming language-agnostic interface specification. The processor 2310 may then graphically interact with a user via a guided navigation, no-code wizard user interface to collect additional information associated with the standard, programming language-agnostic interface specification. A semantic model is then automatically generated by the processor 2310 component based on characteristics of the received standard, programming language-agnostic interface specification and the additional information. A smart adapter generator may receive the semantic model along with information about the standard, programming language-agnostic interface specification and automatically generate a Cloud Integration adapter.

The programs 2312, 2314 may be stored in a compressed, uncompiled and/or encrypted format. The programs 2312, 2314 may furthermore include other program elements, such as an operating system, clipboard application, a database management system, and/or device drivers used by the processor 2310 to interface with peripheral devices.

As used herein, information may be "received" by or "transmitted" to, for example: (i) the platform 2300 from another device; or (ii) a software application or module within the platform 2300 from another software application, module, or any other source.

In some embodiments (such as the one shown in FIG. 23), the storage device 2330 further stores an adapter database 2400. An example of a database that may be used in connection with the platform 2300 will now be described in detail with respect to FIG. 24. Note that the database described herein is only one example, and additional and/or different information may be stored therein. Moreover, various databases might be split or combined in accordance with any of the embodiments described herein.

Referring to FIG. 24, a table is shown that represents the adapter database 2400 that may be stored at the platform 2300 according to some embodiments. The table may include, for example, entries identifying integration adapters for a cloud computing environment. The table may also define fields 2402, 2404, 2406, 2408, 2410 for each of the entries. The fields 2402, 2404, 2406, 2408, 2410 may, according to some embodiments, specify an adapter identifier 2402, an OpenAPI document identifier 2404, a semantic model identifier 2406, adapter code 2408, and a catalog status 2410. The adapter generation database 2400 may be created and updated, for example, when new adapters are created or revised, an adapter is published or deleted, etc.

The adapter identifier 2402 might be a unique alphanumeric label that is associated with an integration adapter that has been or will be automatically created for a cloud computing environment. The OpenAPI document identifier 2404 (or Swagger file) may be source material that will be used to create a semantic model associated with the semantic model identifier 2406. The adapter code 2408 represents the binary source code that comprises the automatically generated integration adapter. The catalog status 2410 might indicate, for example, that the creation of the adapter is in process, the adapter has been published or deleted, etc.

Thus, embodiments may provide for the generation and injection of Java source code logic for handling API operations at a receiver side of the adapter based on adapter semantic model definition. Moreover, some embodiments may generate an ADK Java project template, ADK metadata (e.g., CMD), and inject APACHE™ CAMEL component specific attributes based on adapter semantic model definition. A POM transformation for API Java SDK generation may be performed and a single assembly build may generate SAP ADK compliant integration adapter binary code. In addition, embodiments may provide a consumer of an adapter target system understanding while configuring the adapter as it embeds the API specification knowledge. This can help API consumption experience by showing: what APIs are exposed by the backend; what operations each API provides; what a typical API operation invocation method signature looks like; details about security token handling for calling endpoints; identifying API and API operations in user defined aliases, etc.

In this way, embodiments may enable a faster learning curve and quicker turnaround time for developing integration adapters by business users. Further, embodiments may provide generation of vendor-specific, API-based integration adapters on the fly (in an intuitive UI wizard) embedding the knowledge of vendor exposed API specifications. As a result, users don't need previous coding experience to build integration adapter using no-code approach. Embodiments may hide the complexity of understanding ADK concepts because the system generates ADK specific metadata and the ADK compliant integration adapter binary code (CMD, properties file, ESA file, etc.). Embodiments also hide the complexity of learning APACHE™ CAMEL component development (component interfaces, endpoints, processors, EIP patterns, etc.) and provide lifecycle management for integration adapters in UI catalog management (modify, delete, publish, and deploy). This bridges a gap between an integration flow developer (typically a Cloud Integration consultant) and an integration adapter developer (a Java developer with APACHE™ CAMEL expertise).

Figure 25:
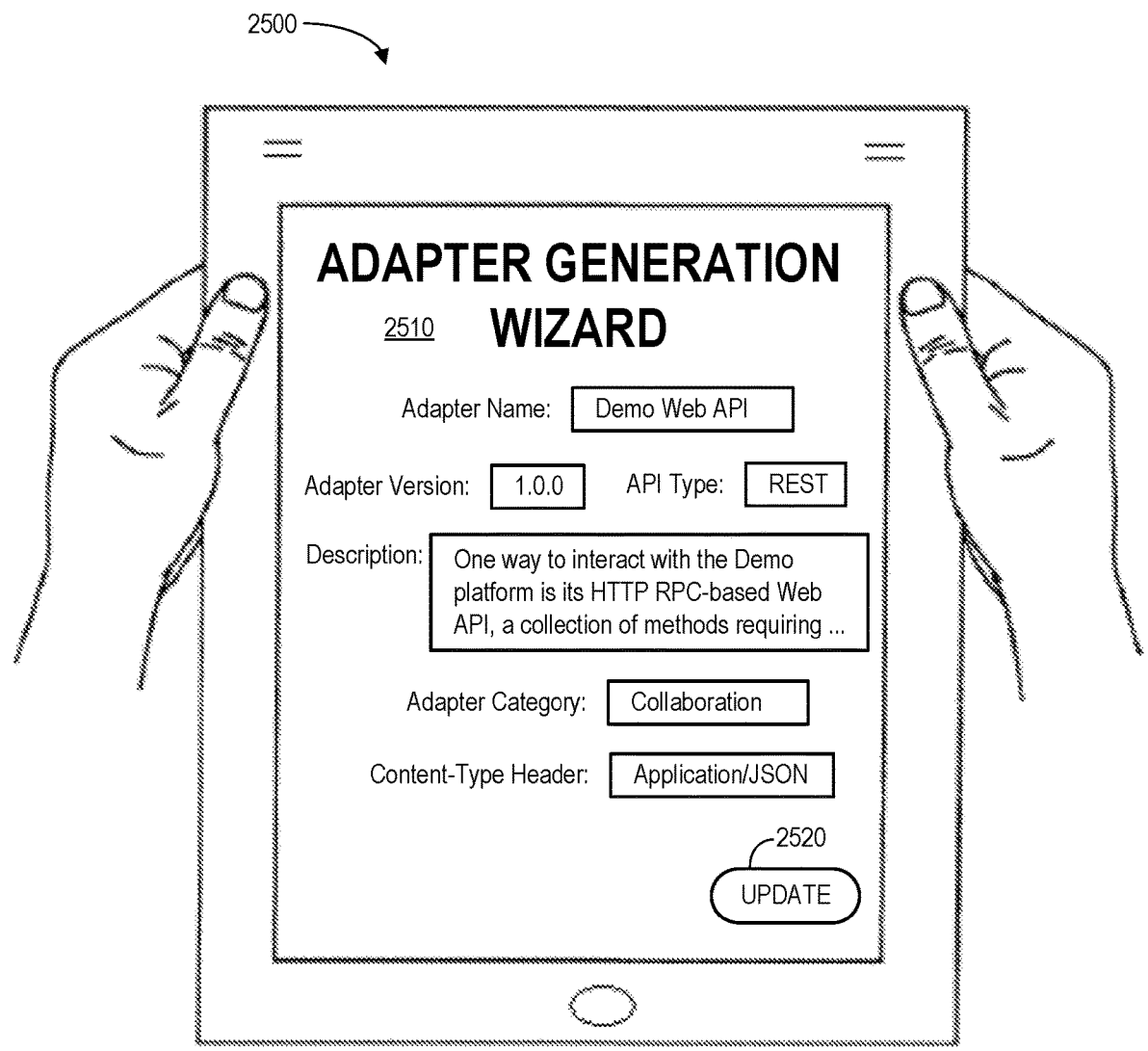
FIG. 25 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of source documents, adapters, etc., any of the embodiments described herein could be applied to other designs. Moreover, the displays shown herein are provided only as examples, and any other type of user interface could be implemented. For example, FIG. 25 illustrates a tablet computer 2500 providing an adapter generation wizard display 2510 according to some embodiments. The display 2510 might be used, for example, to let a user automatically create an integration adapter for a cloud computing environment. Moreover, the display 2510 might be used to update and/or create various adapter parameters (e.g., name, version, type, category, etc.) via an "Update" icon 2520.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:
1. A system for integration adapter generation in a cloud computing environment, comprising:
    a smart adapter user interface component, including:
        a computer processor, and a computer memory storing instructions that, when executed by the computer processor, cause the smart adapter user interface component to:
(i) receive a standard, programming language-agnostic interface specification,
(ii) graphically interact with a user via a guided navigation, no-code wizard user interface to collect additional information associated with the programming language-agnostic interface specification, and
(iii) automatically generate a semantic model based on characteristics of the received programming language-agnostic interface specification and the additional information; and
a smart adapter generator, coupled to the smart adapter user interface component, to receive the semantic model from the smart adapter user interface component along with information about the programming language-agnostic interface specification and automatically generate a cloud integration adapter, generate an Adapter Development Kit ("ADK") Java project template along with ADK metadata, inject integration framework component-specific attributes based on the semantic model, perform a Project Object Model ("POM") transformation for Application Programming Interface ("API") Software Development Kit ("SDK") generation, and generate a single assembly build to create an ADK-compliant integration adapter binary.

2. The system of claim 1, wherein the smart adapter generator is further to generate and inject Java source code logic for handling Application Programming Interface ("API") operations at a receiver side of the cloud integration adapter based on the semantic model.

3. The system of claim 1, wherein the smart adapter generator is further to provide a consumer of an adapter target system exposed Application Programming Interface ("API") information in the integration adapter.

4. The system of claim 1, wherein the programming language-agnostic interface specification is associated with at least one of: (i) an OpenAPI document, and (ii) a Swagger file.

5. The system of claim 1, wherein the integration adapter is associated with at least one of: (i) a protocol-specific integration adapter, and (ii) a vendor-specific integration adapter.

6. The system of claim 1, wherein the smart adapter user interface component further includes:
a catalog manager to perform at least one of: (i) integration adapter modification, (ii) integration adapter download, (iii) integration adapter deployment, (iv) integration adapter publishing, and (v) integration adapter deletion.

7. The system of claim 1, wherein the semantic model is a Java Script Object Notation ("JSON")-based adapter definition file storing at least one of: (i) adapter metadata, (ii) an adapter name, (iii) a vendor, (iv) a version, (v) a type, (vi) an endpoint, (vii) logo image details, (viii) Application Programming Interface ("API") details, and (ix) API operation details.

8. A computer-implemented method for integration adapter generation in a cloud computing environment, comprising:
receiving, by a computer processor of a smart adapter user interface component, a programming language-agnostic interface specification;
graphically interacting with a user via a guided navigation, no-code wizard user interface to collect additional information associated with the programming language-agnostic interface specification;
automatically generating a semantic model based on characteristics of the received programming language-agnostic interface specification and the additional information;
receiving, by a smart adapter generator, the semantic model from the smart adapter user interface component along with information about the programming language-agnostic interface specification;
automatically generating, by the smart adapter generator, a cloud integration adapter;
generating, by the smart adapter generator, an Adapter Development Kit ("ADK") Java project template along with ADK metadata;
injecting, by the smart adapter generator, integration framework component-specific attributes based on the semantic model;
performing, by the smart adapter generator, a Project Object Model ("POM") transformation for Application Programming Interface ("API") Software Development Kit ("SDK") generation; and
generating, by the smart adapter generator, a single assembly build to create an ADK-compliant integration adapter binary.

9. The method of claim 8, wherein the smart adapter generator is further to generate and inject Java source code logic for handling Application Programming Interface ("API") operations at a receiver side of the cloud integration adapter based on the semantic model.

10. The method of claim 8, wherein the smart adapter generator is further to provide a consumer of an adapter target system exposed Application Programming Interface ("API") information in the integration adapter.

11. The method of claim 8, wherein the programming language-agnostic interface specification is associated with at least one of: (i) an OpenAPI document, and (ii) a Swagger file.

12. The method of claim 8, wherein the integration adapter is associated with at least one of: (i) a protocol-specific integration adapter, and (ii) a vendor-specific integration adapter.

13. The method of claim 8, further comprising:
performing, by a catalog manager of the smart adapter user interface, at least one of: (i) integration adapter modification, (ii) integration adapter download, (iii) integration adapter deployment, (iv) integration adapter publishing, and (v) integration adapter deletion.

14. The method of claim 8, wherein the semantic model is a Java Script Object Notation ("JSON")-based adapter definition file storing at least one of: (i) adapter metadata, (ii) an adapter name, (iii) a vendor, (iv) a version, (v) a type, (vi) an endpoint, (vii) logo image details, (viii) Application Programming Interface ("API") details, and (ix) API operation details.

15. A non-transitory, computer-readable medium storing instructions, that, when executed by a processor, cause the processor to perform a method for integration adapter generation in a cloud computing environment, the method comprising:
receiving, by a computer processor of a smart adapter user interface component, a programming language-agnostic interface specification;
graphically interacting with a user via a guided navigation, no-code wizard user interface to collect additional information associated with the programming language-agnostic interface specification;

automatically generating a semantic model based on characteristics of the received programming language-agnostic interface specification and the additional information;

receiving, by a smart adapter generator, the semantic model from the smart adapter user interface component along with information about the programming language-agnostic interface specification;

automatically generating, by the smart adapter generator, a cloud integration adapter;

generating, by the smart adapter generator, an Adapter Development Kit ("ADK") Java project template along with ADK metadata;

injecting, by the smart adapter generator, integration framework component-specific attributes based on the semantic model;

performing, by the smart adapter generator, a Project Object Model ("POM") transformation for Application Programming Interface ("API") Software Development Kit ("SDK") generation; and generating, by the smart adapter generator, a single assembly build to create an ADK-compliant integration adapter binary.

16. The medium of claim 15, wherein the programming language-agnostic interface specification is associated with at least one of: (i) an OpenAPI document, and (ii) a Swagger file.

* * * * *